United States Patent
Park et al.

(10) Patent No.: US 8,229,052 B2
(45) Date of Patent: Jul. 24, 2012

(54) APPARATUS AND METHOD FOR TRANSMITTING/RECEIVING SECONDARY SYNCHRONIZATION CHANNEL IN A BROADBAND WIRELESS COMMUNICATION SYSTEM

(75) Inventors: Sung-Eun Park, Seoul (KR); Jae-Weon Cho, Seongnam-si (KR); Seung-Hoon Choi, Suwon-si (KR); Chi-Woo Lim, Suwon-si (KR); Song-Nam Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 296 days.

(21) Appl. No.: 12/683,728

(22) Filed: Jan. 7, 2010

(65) Prior Publication Data

US 2010/0172436 A1 Jul. 8, 2010

(30) Foreign Application Priority Data

Jan. 7, 2009 (KR) ........................ 10-2009-0001042

(51) Int. Cl.
*H04L 7/00* (2006.01)

(52) U.S. Cl. ........ 375/365; 375/260; 375/295; 375/316; 375/340; 375/354; 375/364; 375/366; 370/203; 370/208; 370/210; 370/330; 370/482; 370/500; 370/503; 370/508; 370/509; 370/510; 370/511; 370/512; 370/513; 370/514; 341/173; 341/180; 455/91; 455/130; 455/502; 327/141

(58) Field of Classification Search .................. 375/260, 375/295, 316, 340, 354, 364, 365, 366; 370/203, 370/208, 210, 330, 482, 500, 503, 508, 509, 370/510, 511, 512, 513, 514; 341/173, 180; 455/91, 130, 502; 327/141
See application file for complete search history.

(56) References Cited

U.S. PATENT DOCUMENTS

| | | | |
|---|---|---|---|
| 7,095,811 B1 | 8/2006 | Shikh-Bahaei et al. | |
| 7,764,593 B2 * | 7/2010 | Kim et al. | 370/208 |
| 7,769,119 B2 * | 8/2010 | Chun et al. | 375/354 |
| 2001/0048714 A1 | 12/2001 | Jha | |
| 2005/0002446 A1 | 1/2005 | Litwin et al. | |

* cited by examiner

*Primary Examiner* — Leon Flores
(74) *Attorney, Agent, or Firm* — Jefferson IP Law, LLP

(57) ABSTRACT

An apparatus and method for transmitting/receiving an S-SCH in an Institute of Electrical and Electronics Engineers (IEEE) 802.16m wireless communication system are provided. A method for transmitting, by a transmitter, a Secondary Synchronization CHannel (S-SCH) in a communication system includes generating a sequence depending on a cell IDentification (ID), determining a subcarrier set comprising subcarriers to map the generated sequence, based on a Fast Fourier Transform (FFT) size and a segment ID, and mapping the generated sequence to the subcarriers of the determined subcarrier set.

20 Claims, 12 Drawing Sheets

APPARATUS AND METHOD FOR TRANSMITTING/RECEIVING SECONDARY SYNCHRONIZATION CHANNEL IN A BROADBAND WIRELESS COMMUNICATION SYSTEM

PRIORITY

This application claims the benefit under 35 U.S.C. §119(a) to a Korean patent application filed in the Korean Intellectual Property Office on Jan. 7, 2009 and assigned Serial No. 10-2009-0001042, the entire disclosure of which is hereby incorporated by reference.

BACKGROUND OF THE INVENTION

1. Field of the Invention

The present invention relates to a Synchronization CHannel (SCH) of a broadband wireless communication system. More particularly, the present invention relates to an apparatus and method for transmitting/receiving a Secondary SCH (S-SCH) for distinguishing a cell IDentification (IDcell) in an Institute of Electrical and Electronics Engineers (IEEE) 802.16m wireless communication system.

2. Description of the Related Art

Many wireless communication technologies have been proposed as candidates of a high speed mobile communication. Among these, an Orthogonal Frequency Division Multiplexing (OFDM) technology is now recognized as the leading next-generation wireless communication technology. In the future, it is expected that the OFDM technology will be used in most of the wireless communication technologies. At present, even the IEEE 802.16 Wireless Metropolitan Area Network (WMAN), which is referred to as a 3.5-Generation (3.5G) technology, adopts the OFDM technology as its standard.

The OFDM scheme is a scheme of transmitting data using a multi-carrier. Namely, the OFDM scheme is a type of Multi Carrier Modulation (MCM) scheme of parallel converting symbol streams input in series and modulating each of the symbol streams into a plurality of sub-carriers having cross orthogonality, i.e., a plurality of sub-channels for transmission.

In a system using the OFDM scheme, a Base Station (BS) transmits an SCH to a Mobile Station (MS) for the sake of timing synchronization and BS distinguishment. Accordingly, the MS may distinguish the BS to which the MS belongs using the SCH. A position where the SCH is transmitted is predefined between a transmitter and a receiver. As a result, the SCH operates as a kind of reference signal.

As a design method for the SCH, a variety of methods may be used, but the most noticed method is currently a method of loading and transmitting a Pseudo-Random (PR) sequence native to a BS on subcarriers at preset intervals in a frequency domain. In the case of mapping a sequence at preset intervals without loading and transmitting a sequence on all subcarriers, regarding a time domain signal after an Inverse Fast Fourier Transform (IFFT) operation, it may be identified that a repetition of a constant pattern takes place within an OFDM symbol. At this time, the repetition count is varied depending on the sequence mapping interval of the frequency domain.

An SCH used in an IEEE 802.16e system of the related art is described below.

FIG. 1 is a diagram illustrating a frequency domain signal of an SCH according to the related art.

Referring to FIG. 1, in the SCH of the related art, a sequence value is allocated at an interval of every third subcarrier in the frequency domain.

A time domain signal of an SCH corresponding to that of FIG. 1 is illustrated in FIG. 2.

FIG. 2 is a diagram illustrating a time domain signal of an SCH according to the related art.

Referring to FIG. 2, the SCH of the related art has a format in which the same signal is repeated 3 times in a time domain. An MS acquires timing synchronization using a repetition pattern of the SCH. At this time, a size of IFFT is equal to the power of '2' but '3' (repetition count) is not equal to a divisor of the IFFT size and therefore, the three-time repetition pattern is not a complete repetition pattern but an incomplete repetition pattern. Accordingly, in case that the MS is positioned at a cell boundary or cell edge of a BS, there may occur a problem that, because an SCH of an adjacent cell acts as interference, the three-time repetition pattern is broken, thus causing a difficulty in performing timing synchronization.

Also, the SCH of the related art uses a sequence of the same length as that of the number of subcarriers allocated to one SCH. An IEEE 802.16e system of the related art uses 114 sequences to distinguish all of 114 BSs. For example when a length of IFFT is equal to '1024', a length of each sequence is equal to '284' which is the number of subcarriers allocated to one SCH. At this time, an MS determines correlation values between a received SCH signal and the 114 sequences previously possessed, and acquires a cell ID.

An IEEE 802.16m system, a system evolving from the IEEE 802.16e system of the related art, requires more cell IDs than the IEEE 802.16e system of the related art to support a Femto cell. Also, even the number of sequences of an SCH symbol for transmitting a cell ID is increased in proportion to the number of cell IDs. At this time, in general, a correlation characteristic between sequences is deteriorated and thus cell ID detection performance is degraded. Also, a Peak to Average Power Ratio (PAPR) of the sequence increases and thus a margin capable of boosting a transmit power of an SCH decreases.

Also, the IEEE 802.16m system may require that an SCH include supplementary information other than cell ID information for transmission. An example of the supplementary information may be a BS type, sector or segment information, a Fast Fourier Transform (FFT) size, a system bandwidth, etc.

Compared to the IEEE 802.16e system of the related art, the IEEE 802.16m system uses two different types of different symbols (i.e., a Primary SCH (P-SCH) and an S-SCH) to meet additional requirements of the increasing number of cell IDs, supplementary information transmission, etc. At this time, the IEEE 802.16m P-SCH and S-SCH have to divide and perforin a function of an IEEE 802.16e SCH and new functions required by an IEEE 802.16 in SCH. Accordingly, there is a need to define new functions to be carried out by each of the IEEE 802.16m P-SCH and S-SCH. Also, there is a need for a definition of a method for mapping between a sequence of each of the IEEE 802.16m P-SCH and S-SCH and subcarriers.

SUMMARY OF THE INVENTION

An aspect of the present invention is to address at least the above problems and/or disadvantages and to provide at least the advantages below. Accordingly, one aspect of the present invention is to provide an apparatus and method for transmitting/receiving a Secondary Synchronization CHannel (S-SCH) for making cell IDentification (ID) distinguishment possible in a broadband wireless communication system.

Another aspect of the present invention is to provide a method for mapping between a sequence of an S-SCH and subcarriers in an Institute of Electrical and Electronics Engineers (IEEE) 802.16m wireless communication system.

A further aspect of the present invention is to provide an apparatus and method for, in a transmitter, generating a sequence depending on a cell ID and generating and transmitting an S-SCH and, in a receiver, receiving the S-SCH and detecting the sequence in an IEEE 802.16m wireless communication system.

A yet another aspect of the present invention is to provide an apparatus and method for determining a subcarrier set including subcarriers to be mapped with a sequence, based on a Fast Fourier Transform (FFT) size and a segment ID in an IEEE 802.16m wireless communication system.

The above aspects are addressed by providing an apparatus and method for transmitting/receiving an S-SCH in a broadband wireless communication system.

According to one aspect of the present invention, a method for transmitting, by a transmitter, an S-SCH in a communication system is provided. The method includes generating a sequence depending on a cell ID, determining a subcarrier set comprising subcarriers to map the generated sequence, based on an FFT size and a segment ID, and mapping the generated sequence to the subcarriers of the determined subcarrier set.

According to another aspect of the present invention, a transmitter for transmitting an S-SCH in a communication system is provided. The transmitter includes a sequence generator for generating a sequence depending on a cell ID, and a subcarrier mapper for determining a subcarrier set comprising subcarriers to map the generated sequence, based on an FFT size and a segment ID, and for mapping the generated sequence to the subcarriers of the determined subcarrier set.

According to a further aspect of the present invention, a method for receiving, by a receiver, an S-SCH in a communication system is provided. The method includes extracting signals of a subcarrier set corresponding to a segment ID from a received signal, the subcarrier set being determined based on an FFT size and the segment ID, and demodulating the extracted signals of the subcarrier set and detecting a sequence dependent on a cell ID.

According to a yet another aspect of the present invention, a receiver for receiving an S-SCH in a communication system is provided. The receiver includes a subcarrier extractor for extracting signals of a subcarrier set corresponding to a segment ID from a received signal, the subcarrier set being determined based on an FFT size and the segment ID, and a demodulator for demodulating the extracted signals of the subcarrier set and for detecting a sequence dependent on a cell ID.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will become more apparent from the following description taken in conjunction with the accompanying drawings in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein may be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A way to generate and transmit/receive an S-SCH for distinguishing a cell IDentification (ID) in an Institute of Electrical and Electronics Engineers (IEEE) 802.16m wireless communication system using an Orthogonal Frequency Division Multiple Access (OFDMA) scheme according to an exemplary embodiment of the present invention is proposed below.

An exemplary structure of the IEEE 802.16 in wireless communication system and a function of the S-SCH are described below.

Figures 1, 2:
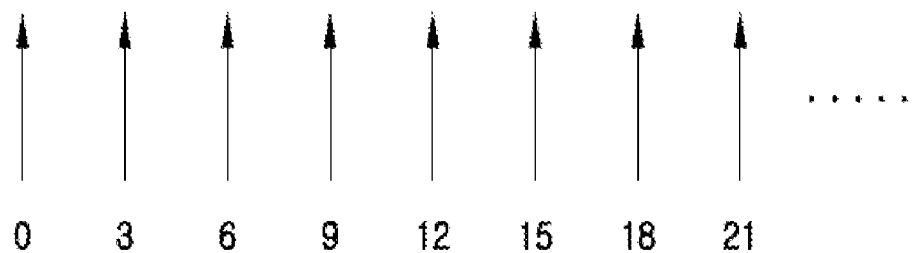
FIG. 1 is a diagram illustrating a frequency domain signal of a Synchronization CHannel (SCH) according to the related art.
FIG. 2 is a diagram illustrating a time domain signal of an SCH according to the related art.
Figure 3:
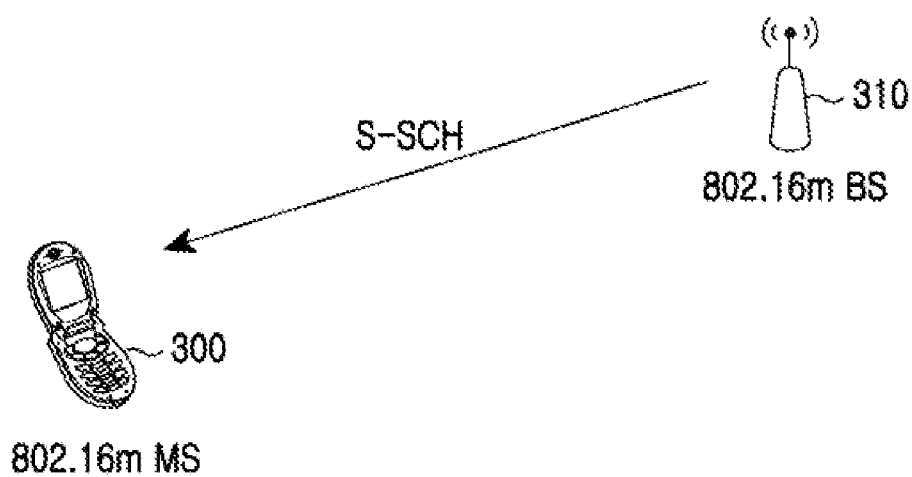
FIG. 3 is a diagram illustrating a Base Station (BS) and a Mobile Station (MS) of an Institute of Electrical and Electronics Engineers (IEEE) 802.16m wireless communication system according to an exemplary embodiment of the present invention.

FIG. 3 is a diagram illustrating a Base Station (BS) and a Mobile Station (MS) of an IEEE 802.16m wireless communication system according to an exemplary embodiment of the present invention Referring to FIG. 3, in order for the IEEE 802.16m MS 300 and the IEEE 802.16m BS 310 to perform communication, the IEEE 802.16m MS 300 has to acquire a cell ID of the IEEE 802.16m BS 310 through an S-SCH signal transmitted by the IEEE 802.16m BS 310. Here, the cell ID includes a segment ID.

Figure 4:
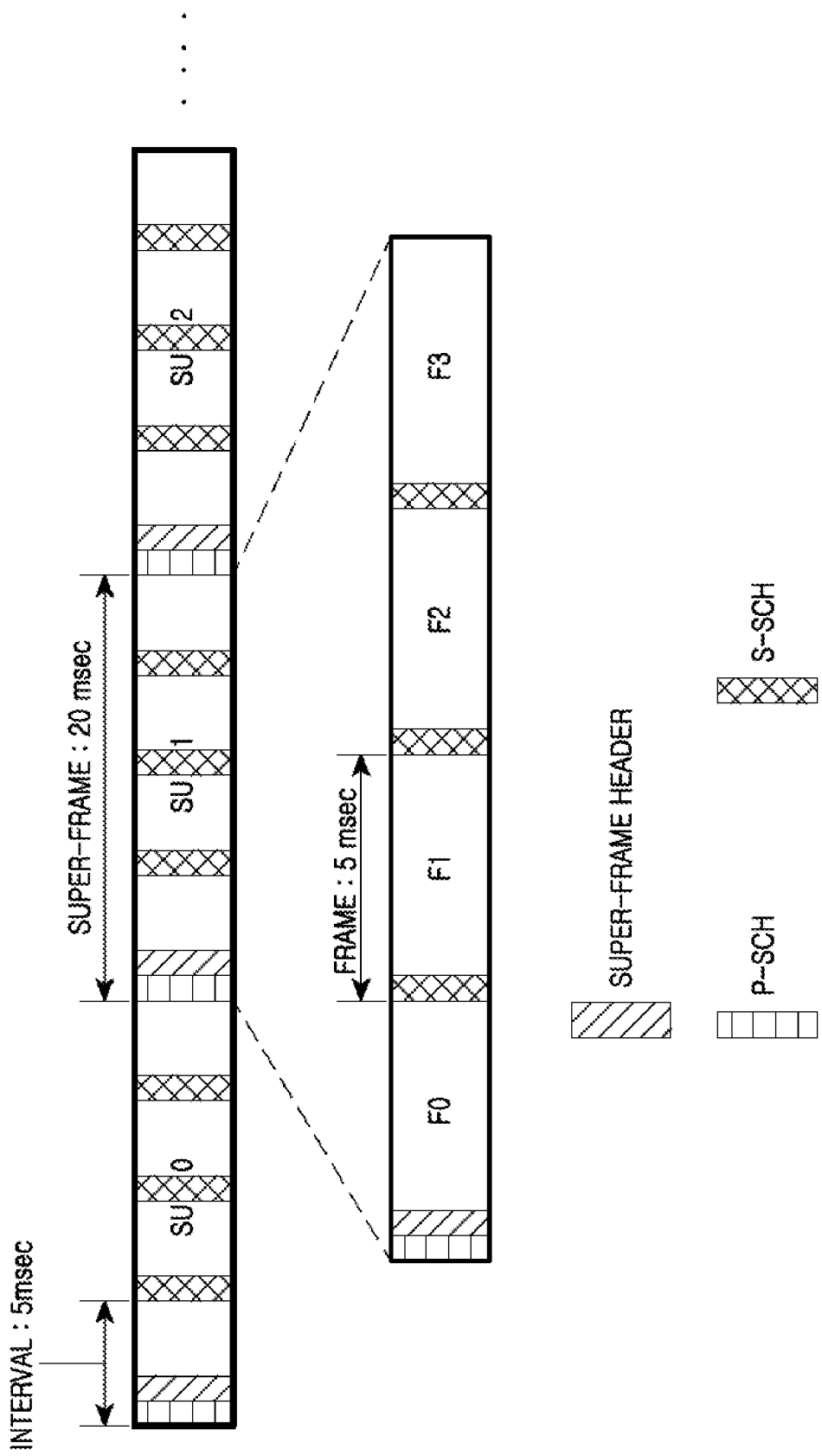
FIG. 4 is a diagram illustrating positions of a Primary SCH (P-SCH) and a Secondary SCH (S-SCH) in an IEEE 802.16m frame structure according to an exemplary embodiment of the present invention.

FIG. 4 is a diagram illustrating positions of a Primary SCH (P-SCH) and a Secondary SCH (S-SCH) in an IEEE 802.16m frame structure according to an exemplary embodiment of the present invention.

Referring to FIG. 4, in the IEEE 802.16m frame structure, a super-frame has a time interval of 20 msec, and includes four frames each having a time interval of 5 msec. In an exemplary implementation, one P-SCH symbol and three S-SCH symbols may be positioned at intervals of 5 msec within one super-frame. The P-SCH symbol is positioned within a Super-Frame Header (SFH). Here, although the P-SCH symbol and the S-SCH symbols are changed in number and position, it is undoubted that the proposal of the exemplary embodiment of the present invention is substantially identically applicable.

A method for determining a subcarrier set corresponding to each segment ID according to an exemplary embodiment of the present invention is described below.

In an exemplary embodiment of the present invention, a length ($N_{SSCH}$) of a sequence for an S-SCH is varied depending on a size of FFT. The length ($N_{SSCH}$) of the sequence for the S-SCH is equal to '144' at a 512-FFT size, '288' at a 1024-FFT size, and '576' at a 2048-FFT size, respectively. The subcarrier set corresponding to each segment ID is determined in Equation 1 below:

$$SSCHCarrierSet_n = n + 3 \cdot k + 40 \cdot \frac{N_{SSCH}}{144} + \left\lfloor \frac{2 \cdot k}{N_{SSCH}} \right\rfloor \quad (1)$$

In Equation 1, '$SSCHCarrierSet_n$' denotes an $n^{th}$ subcarrier set, and 'n' denotes an index of a subcarrier set corresponding to a segment ID and has a value of '0', '1', or '2'. Assuming that there exist all three segments and each of the segments is expressed as 'Segment0', 'Segment1', or 'Segment2', 'Segment0' uses a subcarrier set (SSCHCarrierSet$_0$), 'Segment1' uses a subcarrier set (SSCHCarrierSet$_1$), and 'Segment2' uses a subcarrier set (SSCHCarrierSet$_2$). 'k' denotes a miming index having a value of '0' to '$N_{SSCH}$-1' depending on an FFT size. A position of a Direct Current (DC) subcarrier in the subcarrier set is equal to '256' at a 512-FFT size, '512' at a 1024-FFT size, and '1024' at a 2048-FFT size, respectively.

Figure 5:
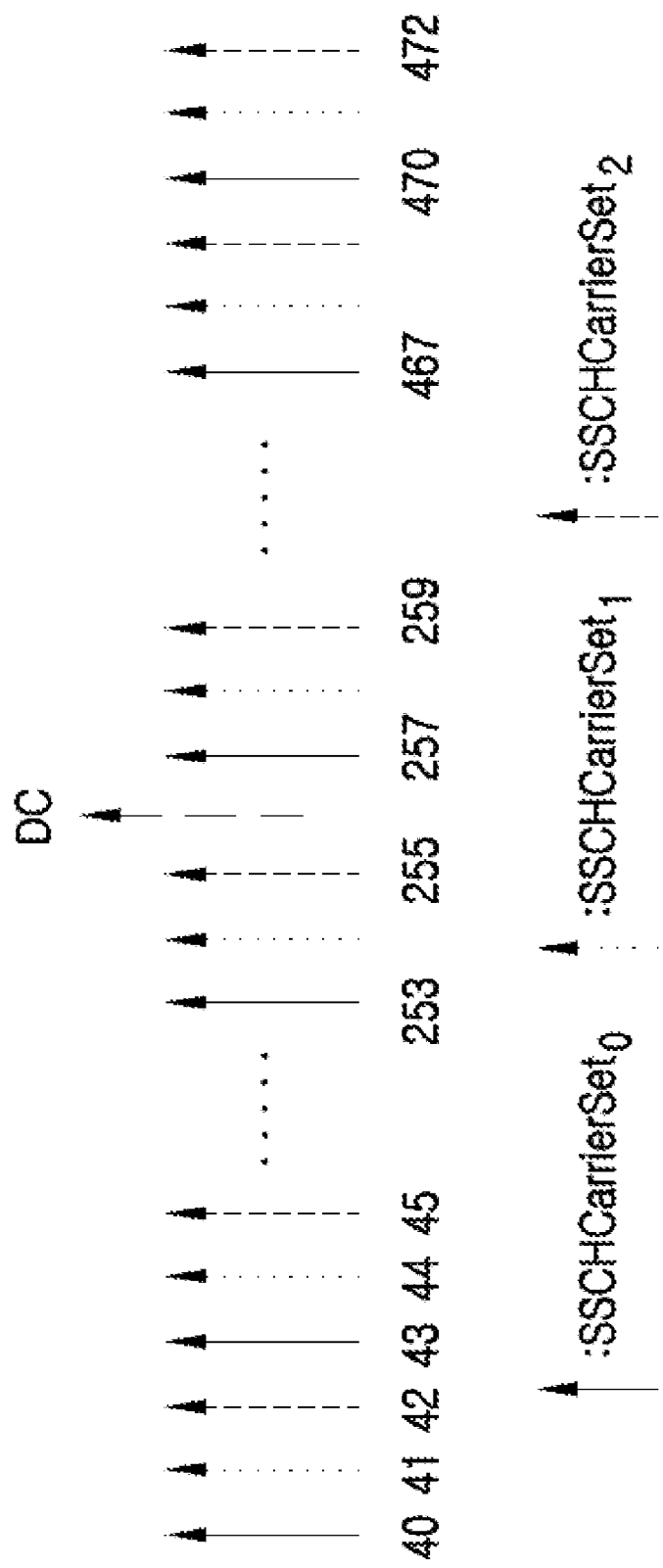
FIG. 5 is a diagram illustrating a subcarrier set at a 512 Fast Fourier Transform (FFT) size according to an exemplary embodiment of the present invention.
Figure 6:
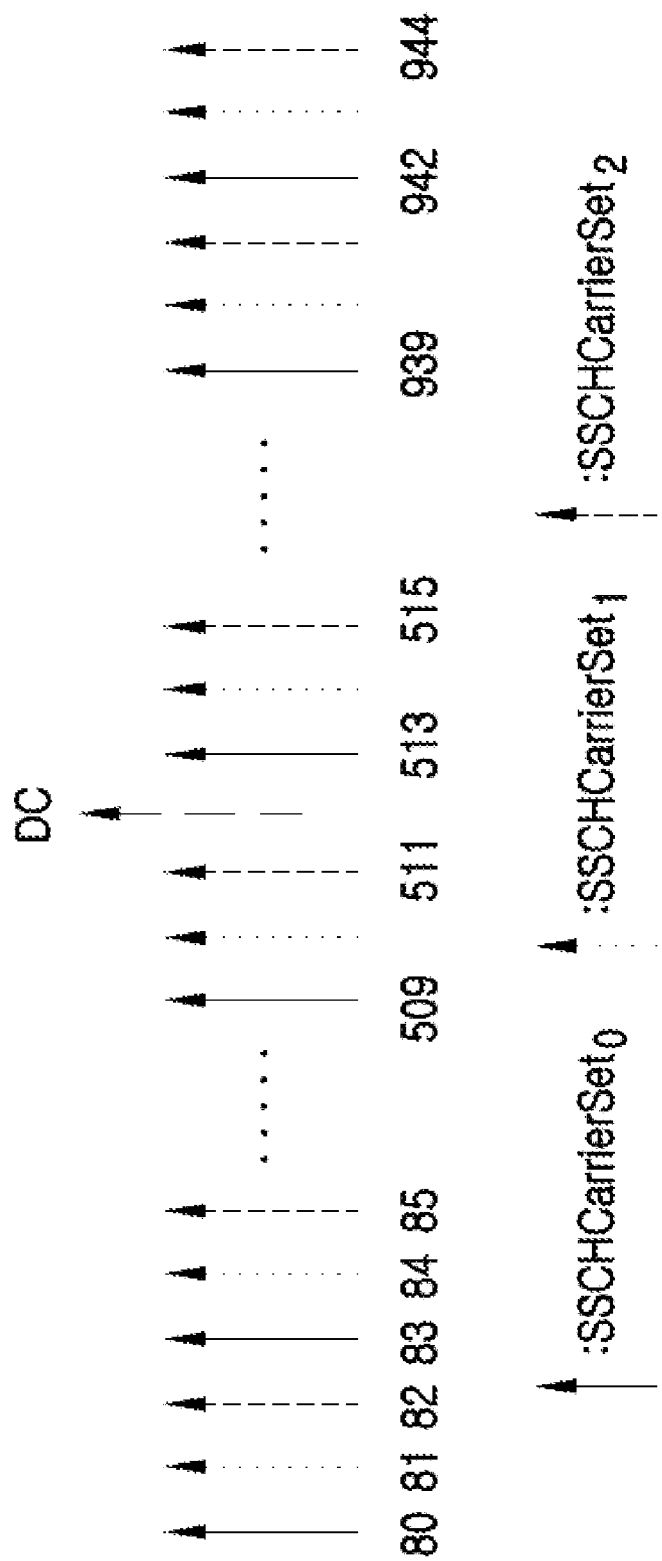
FIG. 6 is a diagram illustrating a subcarrier set at a 1024-FFT size according to an exemplary embodiment of the present invention.
Figure 7:
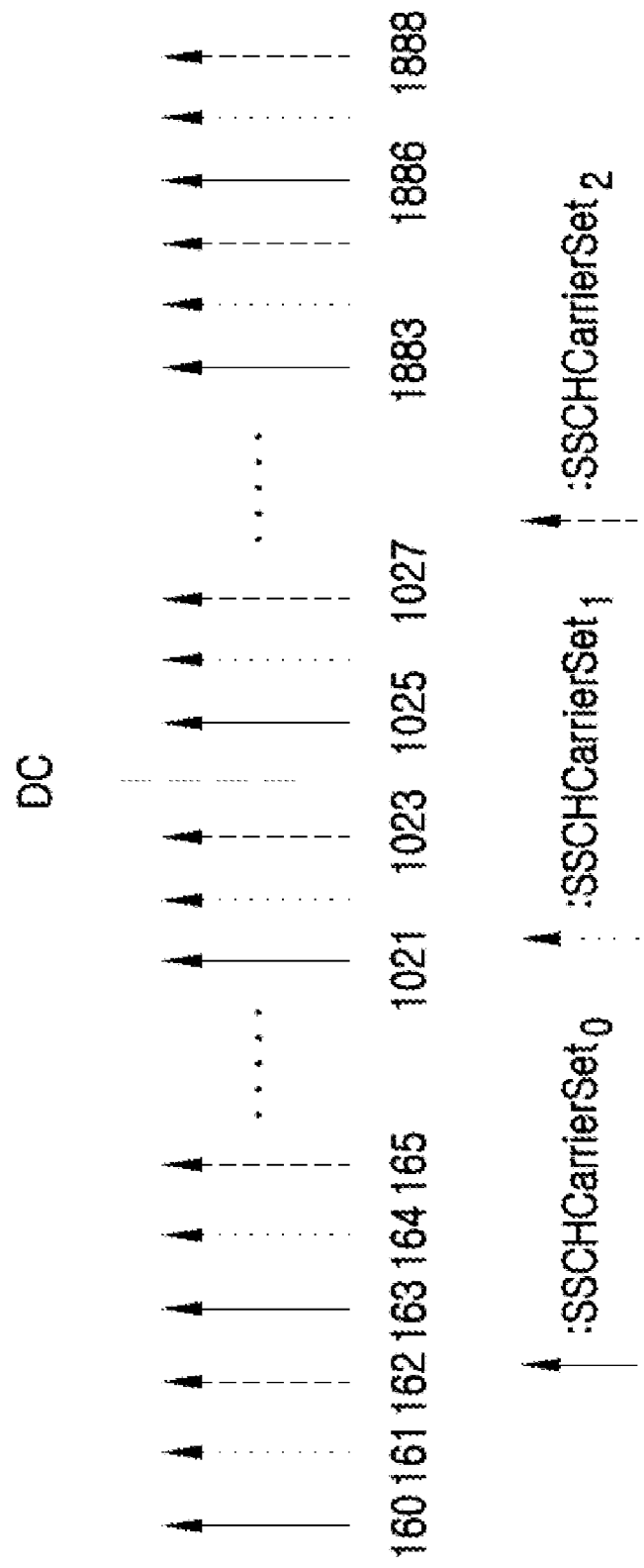
FIG. 7 is a diagram illustrating a subcarrier set at a 2048-FFT size according to an exemplary embodiment of the present invention.

FIGS. 5, 6, and 7 each are diagrams illustrating subcarrier sets each corresponding to segment IDs at a 512-FFT size, a 1024-FFT size, and a 2048-FFT size according to an exemplary embodiment of the present invention.

As illustrated in FIGS. 5, 6, and 7, in the left and right regions centering on a DC subcarrier, subcarrier sets each corresponding to segments are comprised of subcarriers each having three intervals. Near the DC subcarrier, a subcarrier set is comprised of subcarriers each having four intervals. A description is made below in detail by way of an example with respect to FIG. 5. At a 512-FFT size, a subcarrier set (SSCHCarrierSet$_0$) used in a 'Segment0' has subcarrier indexes of '40', '43', '46', '49', . . . , '247', '250', '253', '257', '260', '263', . . . , '464', '467', and '470'. That is, in each of the left and right regions centering on a DC subcarrier index of '256', the subcarrier set (SSCHCarrierSet$_o$) is comprised of subcarriers whose indexes increase by '3'. An interval between the subcarrier indexes of '253' and '257' near the DC subcarrier is equal to '4'.

If a subcarrier set is determined as above, a three-time repetition pattern of the IEEE 802.16e SCH of the related art does not appear in a time domain. This feature is advantageous in that, in a coexistence mode in which an IEEE 802.16m BS supports all of an IEEE 802.16e MS and an IEEE 802.16m MS, there exists only one type of symbol in which a three-time repetition pattern appears in a time domain and thus, each MS easily acquires timing synchronization.

A method for determining a sequence corresponding to a cell ID according to an exemplary embodiment of the present invention is described below.

An exemplary embodiment of the present invention proposes to use all of 768 cell IDs (IDcell). A value of the cell ID has a range of '0' to '767', and is determined by a segment ID (n) and a running index (Idx) as in Equation 2 below. Here, the segment ID (n) has a value of '0', '1', or '2', and the limning index (Idx) has a value of '0' to '255'.

$$IDcell = 256 \cdot n + Idx \quad (2)$$

An S-SCH sequence corresponding to the cell ID determined through Equation 2 above is configured using eight sequence blocks ($S_0$, $S_1$, . . . , $S_7$). Lengths of sequences included in each sequence block ($S_0$, $S_1$, . . . , $S_7$) are equal to '72'.

Figure 8:
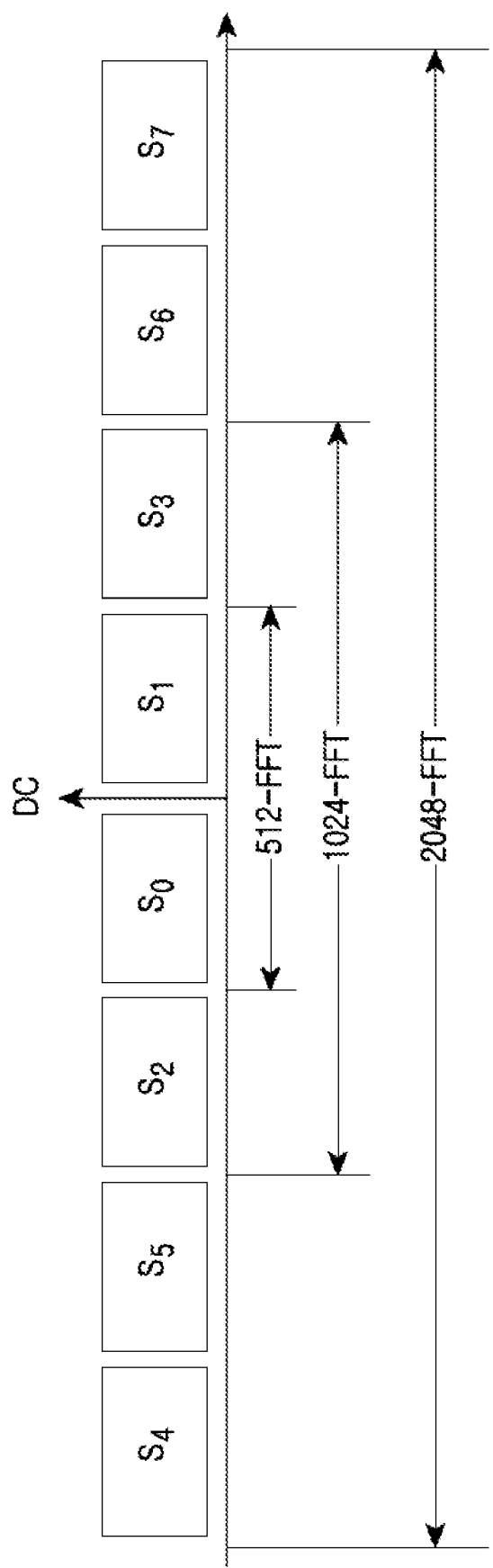
FIG. 8 is a diagram illustrating an arrangement of each sequence block in a frequency domain depending on an FFT size according to an exemplary embodiment of the present invention.

FIG. 8 is a diagram illustrating an arrangement of each sequence block in a frequency domain depending on an FFT size according to an exemplary embodiment of the present invention.

Referring to FIG. 8, in the case of a 512-FFT size, a sequence corresponding to a running index (Idx) is sequentially selected from sequence blocks $S_0$ and $S_1$, and the sequentially selected sequence is modulated into a power-boosted BPSK signal and is sequentially mapped to a subcarrier set corresponding to a segment ID (n). In the case of a 1024-FFT size, a sequence corresponding to a running index (Idx) is sequentially selected from sequence blocks ($S_2$, $S_0$, $S_1$, and $S_3$), and the sequentially selected sequence is modulated into a power-boosted BPSK signal and is sequentially mapped to a subcarrier set corresponding to a segment ID (n). In the case of a 2048-FFT size, a sequence corresponding to a running index (Idx) is sequentially selected in sequence blocks ($S_4$, $S_5$, $S_2$, $S_0$, $S_1$, $S_3$, $S_6$, and $S_7$), and the sequentially selected sequence is modulated into a power-boosted BPSK signal and is sequentially mapped to a subcarrier set corresponding to a segment ID (n). A structure of FIG. 8 in which S-SCH signals are overlapped depending on a frequency bandwidth is referred to as a scalable structure. As such, an S-SCH signal is comprised of sequences having a feature of scalability for a variety of FFT sizes and thus, there is an advantage that an S-SCH may support a variety of MSs each supporting different bandwidths.

Table 1 below is a hexadecimal expression of an example of a sequence corresponding to a running index (Idx) by sequence block. A length of each sequence is equal to '72'.

TABLE 1

| Idx | $S_0$ | $S_1$ | $S_2$ | $S_3$ |
|---|---|---|---|---|
| 0 | 602CFC3499A4B346A1 | D6D04E0C95CCE7C60F | 60C5F82E201678AF4D | 54AF23D77D49C9209F |
| 1 | 19F90B577AF31B289D | EEF8AEBA56D7832F09 | 781F066BACDD3A90F3 | 5DBB49C352F7DCC37B |
| 2 | 58041C83A54037A858 | CE154FB719785A01B1 | 69CE6DC40FD792B4A9 | 564E5B7C86A3C9863E |
| 3 | 21CE141FB9E8603E64 | F62250FE25E3211748 | 71149381831CD08CE8 | 5F45CE97569DC39A25 |
| 4 | 78E9FD8EEA900E86E0 | DFC423E6BA72EDDDEB | 6224877A240387F613 | 54FA5BD629497C7895 |
| 5 | 013C0AED09B846E8DC | E7F33CAF86966934ED | 7AE186C1A8B725CE52 | 5DF1C9C206F7766371 |
| 6 | 40DEE539D674959019 | C71EDA5D36B9B01DAA | 6B2F156FF4426DEDF7 | 5604DB7C2D5C832634 |
| 7 | 3914EA5BCADCC20625 | FF29C515F5A2CB0CAC | 73F5ECD478F6CFD249 | 5F0F4E97FD6296C5D0 |
| 8 | 69389621499AB95ABA | D43131596E590760AE | 608F7FD174692DF747 | 54B0F17DD6C9D6D5CA |
| 9 | 10ED66BCAACD0ECB79 | EC062E1052BD838E57 | 7855819507226FCF06 | 5DA49C96068823362E |
| 10 | 510F8E978AFE224BBC | CCEBC8E31D125AA0EF | 6984EDC4A45727ECA3 | 565189D7D2DC298C94 |
| 11 | 28C581F469D66A227F | F4C32FABDE76DE49E9 | 715E1380D71C65D31D | 5F5A1C3C029DDC6F70 |
| 12 | 71FD9064C52E049AFB | DD255B4CBE670D7CB5 | 626E077A8F832D5619 | 54E5897D7D36838DC0 |
| 13 | 083798F8D9864CF338 | E50DBC0582838995B3 | 7AAB013F0348709658 | 5DF1E3695288899624 |
| 14 | 49CA88D3F9B57F8C02 | C5FFA2F6CD53B0BCF4 | 6B7A6A90A042C74A02 | 561B09D77923632C9E |
| 15 | 300087B01A9D281DC1 | FDD74241F1C8D455F2 | 73BF6CD52C898575BC | 5F109C3CA91D69377A |
| 16 | 62D27C9F624EB3E000 | D69ACE0C3E33AD6605 | 60DA2A848BE998A218 | 54AF23D77C63638DCA |
| 17 | 1B078BFC81190471C3 | EEADD6BAFD28D67703 | 7800D33EF8A2C56259 | 5DBB49C2AC229669D1 |
| 18 | 5AE564285EAA28F106 | CE5FC849B2F8F0A1BB | 69D1B890A4286D41FC | 5651A48287F69CD36B |
| 19 | 233094B5BDFD809F3A | F67728FE8E1C7448BD | 710B46D528E3308642 | 5F45CE96A83776CF70 |
| 20 | 7A0882DB117A11DFBE | DF8EA3E6118DA77A1E | 6224AA2E8F83980346 | 54FA5C29D7E3D6D23F |
| 21 | 03DD75B90DD2464982 | E7A644AED296DC6CE7 | 7AFE53950348DA3CF8 | 5DF1CE3DF85DC331DB |
| 22 | 4220626C2D9E953147 | C74BA25D9D46FABDA0 | 6B2F383AA03D921F5D | 561B24822C09D67361 |
| 23 | 3BEA6D0E31493D5884 | FF634514A1DD81AB59 | 73F5C67ED376CFD8E3 | 5F0F496803C823977A |
| 24 | 6BC611754D8F46041B | D47BB6A63A26523F5B | 608F557A20692DFDED | 54AF0E8228637C789F |
| 25 | 120C19E951271195D8 | EC5351EEF942D6D1A2 | 7855AB3E53226FC5AC | 5DA49B6807A2966484 |
| 26 | 53EEF63D8E943D151D | CCBEB71C4912F0071A | 699B38900FA8C7E1F6 | 564E76282C0963263E |
| 27 | 2A3B015E6DBC6A8321 | F489A8548A098B161C | 7141C6D47CE385D9B7 | 5F5A1BC203B7693DDA |
| 28 | 731CE8CEC144043C5A | DD70234C159847DB40 | 626E2DD1DBFCCD5B4C | 54FA717C83E3C92095 |
| 29 | 0AD6E7ACDDEC4C5599 | E5473BFB29033CCDB9 | 7AB4D395A8B7909CF2 | 5DF1E49753A23CC371 |
| 30 | 4B2BF78602209F2AA3 | C5AADAF666D31A1B01 | 6B7A47C40BC2C740A8 | 5604F6288789C98634 |
| 31 | 32E1FF1A1E88C8BB60 | FD9DC5BF5A48610DF8 | 73BF418078F6657F16 | 5F109BC357B7C39DD0 |
| 32 | 60798435CDDBF9E154 | D6D064A63E4CF8335A | 60C5F82E2143320218 | 2D652B4A9E61814EA3 |
| 33 | 19AC73562E8C4E7768 | EEF883EEFD578325A3 | 781F066A5277903A59 | 247146A14E206B52B8 |
| 34 | 585164830EC082F7AD | CE0A9D1C4D07A5F31B | 69CE6A3A0EFD27E603 | 2F8453E09A0B9E1002 |
| 35 | 2184941F12172A9991 | F63D85AA8E633EE5E2 | 710B6B807DB67A2642 | 269039F4B5CA6BF3E6 |
| 36 | 78A37A70416F5BD915 | DFDBF14C118D122F41 | 623B7884252932A4B9 | 2D30534BCA613416A9 |
| 37 | 01768AEDA238F3B0D6 | E7F316052D69893E47 | 7AFE793FA99D909CF8 | 243BC15FE5A0C1F54D |
| 38 | 408B9D397D8BC0C813 | C71EF70862B9B01700 | 6B30EA900AE8D8BF5D | 2FCED3E031F4D4B008 |
| 39 | 395E6A5B612388A1D0 | FF3610415E22D4FE06 | 73EA132B865C6578E3 | 26DAB9F5E1CAC153EC |
| 40 | 696DEE21E21A13FD4F | D4311C0C3A591895FB | 608F782F754398A5ED | 2D7AFE1FCA618143F6 |
| 41 | 10A7E6BDFEB2446B73 | EC19FCBAF9427C7B02 | 7855866B06772565AC | 246E940A1A2074A7ED |
| 42 | 515AF168DEFE88EC49 | CCEBE5B7B6EDBAAA45 | 6984EDC4A50272BE09 | 2F9B814A31F47E1AA8 |
| 43 | 288F01F4C2293F7D8A | F4C305008A76C1BB43 | 715E147ED636CF7E48 | 2690135E1E4A74014C |
| 44 | 71B710646EAEB1C2F1 | DD25761815E7128E1F | 6271FF7B712987FCB3 | 2D3079E09E612BE403 |
| 45 | 087D18F98D86F9AB32 | E5126EAF297C766719 | 7AB4FEC0FD9D25C30D | 2424140AB1DF3E0018 |
| 46 | 499FF72CADB5D52BF7 | C5E0705C66D3AF4E5E | 6B7A6A90A1178DE0A8 | 2FD106B49A74D4BAA2 |
| 47 | 304A07B0B11D82BDCB | FDD76F14A5B7345F58 | 73A0932AD25CCFD8E9 | 26DA935EB5CADEA6B9 |
| 48 | 62870361C9CE1947F5 | D6851B596A33B29350 | 60C5D57A8AC3320F4D | 2D7AD34B60CB341BF6 |
| 49 | 1B4D0C03D5664ED636 | EEB203EE56A8D67A56 | 7800D33EF9F78FCF0C | 246EB95EB08AC1F812 |
| 50 | 5AB01BD70AAA9DA90C | CE401D1D190710AB1A | 69D1BF6EA502C7EB56 | 2F84541E9B212B4557 |
| 51 | 2365EB4B1602CA3F30 | F668FA54259C744217 | 710B412B29B67A2CE8 | 26903E0B4B1F3EA14C |
| 52 | 7A420524457ABB784B | DF8EEB345F24770B4 | 623B522E8EA932A9EC | 2D3054B5CB346143FC |
| 53 | 0397F24659AD0CEE77 | E7A66E0586E93C61B2 | 7AFE539502626F6E52 | 243BC15FE48A74A018 |
| 54 | 426AE26C861E20694D | C74B88F6C946FAB70A | 6B2F3FC55E9738B208 | 2FCED3E030A19E1AA2 |
| 55 | 3BBF150F654997F88E | FF6368400A2261A60C | 73F5C67F2DDC6575B6 | 26DAB9F41F606BF946 |
| 56 | 6B8C9175E60FF35C11 | D464640D6E59ADCDF1 | 6090AD7A2143875747 | 2D6501E034CB3416A3 |
| 57 | 12469E17FAA7BB35D2 | EC4C84BA52BD292308 | 784A533E52773A90F9 | 246E93F5E48AC1F2B8 |
| 58 | 53BB89C3256B684AE8 | CCBE9A48E2ED0FF5B0 | 6984C76FF17D92B35C | 2F84794A30A12B4802 |
| 59 | 2A7186A139BCDFDB2B | F48982FE21F674E4B6 | 715E392A7DB6D08B1D | 268FECA01F1F215419 |
| 60 | 73499731953B4E9BAF | DD6FF61941E7A7D1EA | 6271D5D1DAD667F619 | 2D2F81E160CB9EB156 |
| 61 | 0A839FAD89ECF90A6C | E54716AF82FCDCC713 | 7AB4D46BA99D25CE58 | 242413F4B0F58B52B2 |
| 62 | 4B6170795620358D56 | C5B5085CCD2CE5E9AB | 6B7A47C5F5178DEA02 | 2FD1014B64DE61EFF7 |
| 63 | 32AB78E4B5779DE495 | FD8217140E48610752 | 73A0BE7E79A32FD243 | 26C56CA14B1F8BF3EC |
| 64 | 60332E9FCDDB534C0B | D6D04E0C94E64D6B5A | 190FF0B3C341D0C171 | 6C87C49FBE2D523199 |

TABLE 1-continued

| | | | | |
|---|---|---|---|---|
| 65 | 19F926022EF31B25C8 | EEF8AEBA5782D67A5C | 01CAF109B00A8D06CF | 658C51746E13582A7D |
| 66 | 58043628F13FC85AF2 | CE154FB6E7D2F0AB1B | 101B9D59EC80252295 | 6E66BBCA45B8B290C7 |
| 67 | 21D1C14AEDE87FCB31 | F63DA8FE24C98BBDE2 | 08C1631D9FB4871D2B | 6772D6206A79477323 |
| 68 | 78E9D0DA41100E8BB5 | DFC423E744D8588F41 | 1BEE8FE638ABCF982F | 6CD2BC9F15D218966C |
| 69 | 013C2047A238591A76 | E7ECC3507843239E47 | 033471A24BE08DA791 | 65D92E8AC5EC128A77 |
| 70 | 40DEC86D7D8B759D4C | C70125A2C8131AB700 | 12E51DF2176A3A7BCB | 6E2C3C34EE3807CF32 |
| 71 | 3914C0F1615CDDF48F | FF29C515F48861A1F9 | 0A3FE3B6642178438A | 6727AE213E06122CD6 |
| 72 | 6938BB741DE55957EF | D42EC9596F73B23204 | 194570B297417A617B | 6C87EE3515AD4DC333 |
| 73 | 10ED4BE9FEB2EEC62C | EC19D1EFAC172924FD | 018071091BF5D8593A | 659383DEC59347DF28 |
| 74 | 51105BC3217E224116 | CCEBC8E2E3C7100A45 | 104EE55947008F8560 | 6E796E9F11B8B29D92 |
| 75 | 28DA535EC2298A28D5 | F4DCD05420DC74E343 | 088BE31CCBCBCDBD21 | 6772FC8AC1F9588676 |
| 76 | 71FDBD319151FE497AE | DD3AA4B2BF32582E1F | 1BA40FE76CD4853825 | 6CCD6E35BE520764C6 |
| 77 | 08284A538D8653066D | E51243FA7C29233F19 | 03610E5D1FE027079B | 65C6FBDF9193F280DD |
| 78 | 49CAA58752357F86A8 | C5FFA508CC06E5E9A1 | 12B065F2BCEA90DC3E | 6E33E961BA47E7C598 |
| 79 | 301F52E54EE2C81094 | FDD74241F0E2610758 | 0A7563B7305E32E47F | 67387B7595F9F2267C |
| 80 | 62D251CA36314C12AA | D69ACE0C3F66E7CCAF | 191025E768C1D0CBDB | 6C87C49FBF78189CCC |
| 81 | 1B07A6A9D519047C96 | EEB22944FC027CDA56 | 01CADC5D1BF572F465 | 6593A97590C60D7F28 |
| 82 | 5AE5497CF555C8FBAC | CE5FCFB64C2DA5F311 | 10044FF2B8FFC52FC0 | 6E79443444EDE7C26D |
| 83 | 2330B9E1167D9F6A6F | F668D0FE8F49211A17 | 08C149B6CBB487107E | 6772D62194D3F22189 |
| 84 | 7A08A871BAFA0E2D14 | DF915BE610A70DD0B4 | 1BF15D4C9354306D7A | 6CD2BC9F1487523CC6 |
| 85 | 03C2A713A65259BCD7 | E7B9BB512C4396C1B2 | 09C5CF71FE0292553B | 65C6D68B3B3947DF22 |
| 86 | 422048C7799E8AC3ED | C7545A5D9C6C4FEF0A | 12FAC8A7436A258961 | 6E2C3C34EF12AD6267 |
| 87 | 3BF5B85B65493D522E | FF6342EB5F7734FE0C | 0A3FCEE2CFDE984920 | 673856213F2CA77E7C |
| 88 | 6BD9C3DE19F0B9F14E | D4644EA7C4F318920E | 195AA5E63CBE9A6C2E | 6C981634EB07F89199 |
| 89 | 120C34BDFAD8EE608D | EC4CA9EEF8179C7CF7 | 01F9A3A3B075D85390 | 659383DEC4C6128A7D |
| 90 | 53F1249725143D1FB7 | CCA148E3B7B84555B0 | 104EC80DEC808F8FCA | 6E79696110EDE7CF38 |
| 91 | 2A24D40AC643957674 | F489AFAB74A321BCB6 | 088BCE4860342DB074 | 676D048B3F2C0DD4DC |
| 92 | 73033A65953BE4310F | DD6FDB4C14B2F289EA | 1BBBDAB3C72B7ACA8F | 6CCD6E3440F8B23193 |
| 93 | 0AD6CD78993AC58CC | E5473C04D7D6699F13 | 037EDB084B9AC70ACE | 65C6FBDF90B9582D88 |
| 94 | 4B34252CA9DF7F27F6 | C5AADD0867F9AF4E54 | 12B04F58176A8F2E94 | 6E2C1161BB12B290CD |
| 95 | 32FE2DB0B508C8B1CA | FD823DBEA4E2D458AD | 0A75491C645E32E92A | 6727837594ACA774D6 |
| 96 | 6079A961662419EC01 | D6D064A63F664D660F | 190FF74C3DEB659424 | 154DCBFC5D7AE5A05A |
| 97 | 19AC5E028573AE7A3D | EEF883EEFC7D3670F6 | 01D50EF7B15FD8539A | 1C59A6178D3B104441 |
| 98 | 584EB629A53F62FD07 | CE0A9D1DB3D2EF59B1 | 101B9AA7EDAA8F8FC0 | 17ACB4A9A690E50104 |
| 99 | 219B414A4617356CC4 | F63D825570B67448B7 | 08DE9B1D9E9E32487E | 1EA726BC76D10F1AE0 |
| 100 | 78BCAF24EA90BBD3BF | DFC40EB210A7B88214 | 1BF17019C67E9ACD7A | 1518B402F6FA50FFAF |
| 101 | 0176A7B909B8F3BD83 | E7ECE9FB2C432394ED | 032B8E5C4AB5D8F2C4 | 1C13261726BBA51BB4 |
| 102 | 4094486DD6743F3AB9 | C71EF0F663ECE545AA | 12FAE20C164090D161 | 17E63356F290505EF1 |
| 103 | 395E470FCADC68AC85 | FF3610415F0861AB53 | 0A3FE448650BD2EEDF | 1EEDA6BCDD2E5A4515 |
| 104 | 696DC374B61A13F7E5 | D42EE40DC4F3ADC0AE | 195A8F4C96142F33D1 | 154DE157097AE5AAF0 |
| 105 | 10A7CC17554DA46626 | EC0604BB0797292E57 | 018076F6E5208D0B90 | 1C46734326BB104EEB |
| 106 | 515ADC3D8AFE88E11C | CCEBE5B7B7B8EFFF10 | 10511AA7462A3AD7CA | 17B361F7D0D6F1AF451 |
| 107 | 2890D4A069A93F70DF | F4C302FE8B238B11E9 | 088BE31CCAE167178B | 1EA70BE8DD2EEF104A |
| 108 | 71A8C2CEC5514E305B | DD25761814CDB824B5 | 1BA40FE6927E2F9570 | 151899565D7A4F0D05 |
| 109 | 0862CA52D9F919A198 | E50D96AED7A93CCA4C | 03610E5D1EB56DAACE | 1C130B438D445AEEE1 |
| 110 | 499FDD860635CADEA2 | C5FF8FA398791A1B0B | 01F9A0CBDBFC58E94 | 17E619FDA6EFB0545B |
| 111 | 304A2AE5E5627D489E | FDD76F14A49D9EF20D | 0A6A9C49317487B12A | 1EED8C17892E45B7BF |
| 112 | 6298D1CB624E194D5F | D6851CA76B1907C1FA | 19102218966B7A668E | 154DCBFDA3AFB0F2F0 |
| 113 | 1B52DEA8816651249C | EEADFBEFA8027CD0FC | 01CADC5D1ADFD85930 | 1C4659E87391A516EB |
| 114 | 5AB0317C5ED57DA3A6 | CE5FE2E3182DBA01BB | 101BB7F2B9AA907D6A | 17B34CA8583A5053AE |
| 115 | 237A39E1BDFD35CD9A | F668FA5424B6DEE8BD | 08DEB1B7351E32452B | 1EA726BC77845A4FB5 |
| 116 | 7A422F8EEE855B751E | DF9176B344D8F225E1 | 1BF15D4C920165382F | 1518B4030850E5AD05 |
| 117 | 0397DF130DD2ECE4DD | E7B991FA78438934E7 | 03345B091EB5C7006E | 1C0CD9E92791104EE1 |
| 118 | 42753739D21E206418 | C74B88F6C813AFE25F | 12FACF59424090DBCB | 17E634A8F3C51AF45B |
| 119 | 3BA0C7A5CEC9880DDB | FF7C97BE0B08D4F4A6 | 0A2036E3310BCD1B8A | 1EF25942DC7B0F1040 |
| 120 | 6B8CBC20B2700CA944 | D464640D6F0CF898A4 | 195AA2183DEBD0C684 | 15521EA8F7AFB0FFA5 |
| 121 | 12594B42AEA7BB3F78 | EC4C84BBAC178389A2 | 01805C5C4EDF6D06C5 | 1C598B42D811BAE441 |
| 122 | 53A45C978E94884042 | CCBE9DB71C47BAA0E5 | 104EC80DEDAA25229F | 17B366030C45B05904 |
| 123 | 2A71AC0A6DC33FD67E | F48982FFDF2321B1E3 | 089431B66161671D21 | 1EB8F416BC7BA5BAE0 |
| 124 | 73564264C13B4E96FA | DD7009E6BF4D0D7CBF | 1BA422B3C67E2F9825 | 151899565C50FA5850 |
| 125 | 0A9C4D06DDECF900C6 | E54716AF83A9899246 | 037EDCF64AB56DA79B | 1C130B438C111043B4 |
| 126 | 4B615AD202202A7FFC | C5AAF05D33F9AF44FE | 12AFB0A7E9C03A7BC1 | 17E619FDA7BAFAF90E |
| 127 | 32B4AA4FE1086211C0 | FD9DE8EA0F1D3455F8 | 0A754EE2650B67BB80 | 1EED8BE98804F0E515 |
| 128 | 602CFBCB6771F9EBF4 | AF1A4691769B5057CC | 58F2E766E372FC464B | 4C75DD92F1FD74E0DE |
| 129 | 19F90CA88459AE7DC8 | 972D59D84A7FCB4135 | 402819229046418F5 | 4561B07921BC9EFB3A |
| 130 | 58041B7C5B9562FAF2 | B7C0B8D505D0126872 | 51E68A8D333309A5AF | 4E8B5D38F5E8944180 |
| 131 | 21CE13E0473D356B31 | 8FE85F9DC6CB697974 | 49238CC9740B4B9A11 | 4780C8D325D69E5D9B |
| 132 | 78F60270EBBAA42C4A | A611D37AA6DABA4BD7 | 5A0C603318E7031F15 | 4C3F5D93A5FDDE40D4 |
| 133 | 0123F51308ED13BD89 | 9E26CBCD9A3E3EA2D1 | 42D69E76942C4120AB | 4534C87875BC345CCF |
| 134 | 40C11D3828DE3F3D4C | BECB2D3F2A11F87396 | 5307F227375916FCF1 | 4EC1DD39A197DEE18A |
| 135 | 3914EDA4347668AC8F | 86E3CA7616F563656F | 4BDD0B9D446DB4C4B0 | 47D5B72D8E29D4FA6E |
| 136 | 693891DF48CFEC0FEF | ADFB39C572F150F16D | 58B86099B77256E641 | 4C6A0F385A028B1274 |
| 137 | 10ED6142ABE7A4662C | 95D3DE8DB1EA341F94 | 406299223BC6F4DE00 | 45619AD275BC9EF66F |
| 138 | 511076978BD488E116 | B53E387EFE3A12C92C | 51B3F28C6733BCFDA5 | 4E8B77925E688BB4D5 |
| 139 | 28DA7E0A68FCDF772A | 8D0920C9C2DE89D82A | 4976F33614071EC21B | 4780E27871D69E50CE |
| 140 | 71E26864C47B51CFAE | A4F0AC2EA2B0A51289 | 5A46E7CDB31849BF1F | 4C208F390E7DDE4D81 |
| 141 | 08379F07272CE65992 | 9CD84B6661D43E0470 | 429C1E763FD31478A1 | 452B1D2D21BC2BAE65 |
| 142 | 49CA8F2C071FD526A8 | BC2A526B2E7BE72AC8 | 534D72266359A3A4FB | 4EDE0F92F597DEECDF |
| 143 | 3000804FE43782B76B | 841D4D23ED609C3C31 | 4B978C63EFED019B45 | 47CA658725D634F73B |
| 144 | 62CD83609CE406B2AA | AF4F3E91DD1BFAF039 | 58F2CDCC488D03B4E1 | 4C75DA6D0F283E4A74 |

TABLE 1-continued

| | | | | |
|---|---|---|---|---|
| 145 | 1B1874037FCC512496 | 9767DE271E009E1EC0 | 402833883BB9BE74A0 | 4561B078DF1634566F |
| 146 | 5AE56429A0009DA453 | B78A3F2BAE2F473078 | 51F9582798CCE9A8FA | 4E94A2C6F4C221132A |
| 147 | 233094B5BCA8D5CD90 | 8FA2DF9D6D3423D97E | 493C5E621407B46F44 | 479F30D2DB7C2B0F31 |
| 148 | 7A088524EFD0BB7514 | A644AC840D5A0F13DD | 5A0C4D67B318E315BF | 4C3F5D93A4D774ED81 |
| 149 | 03DD7246F307131B28 | 9E6C4BCD31C16BFADB | 42C94CDDC02C5ED5FE | 4534CF878B16810E65 |
| 150 | 4220626DD3343F9C12 | BE81AD3E7E6EB2D39C | 5307DF739CA6E909A4 | 4EC1DD39A0C2944CDF |
| 151 | 3BEA6D0FCFE3880DD1 | 86A94A7742F5C9C29A | 4BDD26C9EFEDB4C9E5 | 47CA4F2C70FC81AF3B |
| 152 | 6BD9EE8AB35A0CAEB1 | ADAE41C5D90E05A967 | 58A7B232E372491314 | 4C75F0C7A4D7C1B8DE |
| 153 | 120C19E950725B388D | 959959731A6A81479E | 407D4B896FC6EB2B55 | 45619AD274E9CBA4C5 |
| 154 | 53EEF1C38FC1684048 | B56B407E55C5586ED9 | 51B3D826CCB3A308F0 | 4E948F93A0C2211980 |
| 155 | 2A3B015F93693FD18B | 8D5C5F3696A1C37FDF | 49692662BF871EC8B1 | 479F1D867083D4FD9B |
| 156 | 73031730C011516EF0 | A4A5D3D1F6CFF04A83 | 5A46CA9918E7A9B24A | 4C3F7738F0A88B1F2B |
| 157 | 0AC91FACDCC6F90733 | 9C8D349935D494A385 | 4283CCDD6BD31475F4 | 452B1D2D20969EFB30 |
| 158 | 4B340F860375D58009 | BC60D59585FB4D8AC2 | 534D588D3759A3AE51 | 4EC1F06D0B3D6BBE75 |
| 159 | 32FE071BE022621635 | 844832DCB96029643B | 4B97A136BB92FE69EF | 47D59D87248361A591 |
| 160 | 60667BCA3371534C01 | AF1A6C3A22E4B05D66 | 58F2E7671DA7A914E1 | 35BFD2F112AAC376E2 |
| 161 | 19B38CA82FA6FB25C2 | 97328B72E1FFD4B460 | 4028192291130B2B5F | 3CABB8E4C2EB369506 |
| 162 | 584E9C830F95C85D07 | B7C09581AE50126527 | 51E68A8D32664308FA | 375EAA5B16BF23D043 |
| 163 | 218493E0ECC27FCCC4 | 8FF78D376D4B697421 | 49238B374152FECF44 | 3E553FB1397EC9CBA7 |
| 164 | 78A37A71BFC5EE8C40 | A611FE2E0D2545B97D | 5A139832E64DA9B5BF | 35F552F1B92A69D117 |
| 165 | 01697513A312591A7C | 9E391966CE41C1507B | 42C9667695790B8DFE | 3CE13F1A696B9C350C |
| 166 | 408B9AC77CDE959AB9 | BED4F86A7E6E187EC3 | 5307F5D9360C5C565B | 37142DA442C0768FB6 |
| 167 | 395E6DA560093DF37A | 86FC18DD42F563683A | 4BDD0B9D4538E191E5 | 3E1FBFB06D7E636C52 |
| 168 | 697211DE1CCF59501A | ADFB136FD90EB0FBC7 | 58B86767B658E3B4EB | 35A0005BB955237BB7 |
| 169 | 10A7E143FFE70EC1D9 | 95CC0C26E595D412C1 | 40A2969DDC513A18CAA | 3CB46DB06914D69853 |
| 170 | 51450E96DFD422411C | B53E12D5AA45F2C386 | 51B3F28D999916570F | 375E870E42C0DC22E9 |
| 171 | 288F01F4C37C6A28DF | 8D16F59C96A169D280 | 49690CC8152DAB974E | 3E4AEAE5928136390D |
| 172 | 71A8E865907BE497A4 | A4EF7E85F6CF451823 | 5A5918324DCD0315B5 | 35F5785B12AA7623BD |
| 173 | 0862E0F8732C4CFE67 | 9CD861CD35D421F6DA | 4283E617C106412A0B | 3CE115B0C2EB83C059 |
| 174 | 499FF72D531F607EA2 | BC2A7F3F858418D862 | 53528DD99D8CE909AE | 370BF8F116BF96851C |
| 175 | 3055F84F4FC8C8109E | 841D678946E083C964 | 4B978B9C113854C9EF | 3E006D1B39019C9907 |
| 176 | 6298FC9E371B53ED5F | AF4F143A891BE5056C | 58F2CDCDB658491E4B | 35A02AF0EC0069DC48 |
| 177 | 1B4D0BFC2BB31B8363 | 9767F48DB5FF7E146A | 4037CB883AECEB260A | 3CABB8E53C419C3853 |
| 178 | 5AAFE428F47FC8FBA6 | B795ED8105D0A73AD2 | 51F9582666665CFA50 | 3741525AE815897AE9 |
| 179 | 2365EB4B17579F6D9A | 8FA2F2C8394BDC2BD4 | 4923A19DEAAD013DEE | 3E55384EC7AB9C990D |
| 180 | 7A4202DBBBAFF1D2E1 | A65B7E2F5925EF1E88 | 5A13B2984DCDA9B8EA | 35F552F04780DC8442 |
| 181 | 0397F5B9A778464322 | 9E6C669865BE940871 | 42C94B2223EF90B754 | 3CFEC0E4683ED69FA6 |
| 182 | 42751D928734953C18 | BE9E7F952A1152DEC9 | 5318208C620C43A30E | 37142A5A43EADC22E3 |
| 183 | 3BA0EAF09B9CC2ADDB | 86A96723E975C9C830 | 4BDD21361147019CB0 | 3E00404E6C54D63EF8 |
| 184 | 6B8C968A18DAA60944 | ADB1936E8D0E05A3CD | 58B84DCD1DD8E3BE41 | 35BFFFA44780762EE2 |
| 185 | 12469E17FBF2F19F78 | 959973D84E157EB534 | 4062B3896E93BE7E00 | 3CAB924E68419C3506 |
| 186 | 53A471C32441DD1FBD | B57492D4FE3AA79B8C | 51B3D26CD9909A25A | 375E870E4395968FBC |
| 187 | 2A6E795EC769957181 | 8D5C72623D21C37575 | 49692662BED254621B | 3E5512E46C2B9C93A7 |
| 188 | 734990CF946E1BC905 | A4A5FE855D30104029 | 5A46CA98E64D0318E0 | 35F5785B13FF2376E8 |
| 189 | 0A839FAD88B9AC5F39 | 9C92E63261D48B512F | 429C34DD6AF9A1275E | 3CFEEDB0C3BED692F3 |
| 190 | 4B617786A8F57F2003 | BC60F8C0D1FB527F97 | 5352A77C2F98CF6CFB | 371400F1179523D049 |
| 191 | 32AB78E54BDD3749C0 | 8457E789ED1FD69691 | 4B885EC945384B3CBA | 3E1F951AC7D4C9CBAD |
| 192 | 602CD69E3371F9E6A1 | AF1A416E884E050566 | 2138E805005AABD788 | 745D3D2432E60FF627 |
| 193 | 19F921FC2FA6518F62 | 9732A1D9B4D561EB9F | 39FDEE408CEE09EFC9 | 7D56A8CFE2A7E5EDC3 |
| 194 | 581BCE290FEA9D0FA7 | B7DF40D504FAA73D27 | 28337DEED01B41CB93 | 76A3BA71C90C0F5086 |
| 195 | 21CE3EB4ECC2CA999B | 8FF7A79DC7E1DC2BDE | 30F67C555CD003F42D | 7FB7D79A194DE54B62 |
| 196 | 78F628DBBFC544211F | A60E2C85580FEEF197D | 23D990AF044F4B76D6 | 7408452566E6BAA9D2 |
| 197 | 013C2047A36D13B0DC | 9E26CC339B6B6BF07B | 3B036EEA8884094E97 | 7D03D730B6D8AF4A36 |
| 198 | 40C137937CA1DF3019 | BED4D53F2B3B4D213C | 2AD20544DA4715E92D | 76E93D8F628CBA0F73 |
| 199 | 3914C70E9FF668A625 | 86E3CD8817A029C83A | 321704FEA745E3528C | 7FE2A864B2CD501368 |
| 200 | 6938BC8BE33013FABA | ADE4C1C573A405A438 | 21726FFA5425E17782 | 745D178E99660FFC8D |
| 201 | 10F2B3E9FF985B9379 | 95CC2173B0BF7EB53E | 39B76E4027115CB03C | 7D497A64B6D805E769 |
| 202 | 51105BC3205488EC43 | B521C780FF6F586479 | 2879FA118464149399 | 76BC68DB628C10A22C |
| 203 | 28DA535F3C83208580 | 8D0927363C7423757F | 30BCFC55F72F495427 | 7FA802CF4D320541C8 |
| 204 | 71E24531907B51C504 | A4F0ABD15C1A0FBFDC | 239310AE504FFE2923 | 7417978E32E6BAA378 |
| 205 | 0837B5AD8CACF9AB38 | 9CD84C9860FE8B5125 | 3B49E914237B43EE9D | 7D1C059BE2A750BF63 |
| 206 | 49D55D87531FD52C02 | BC35AD952F2EB27F9D | 2A9885447F8E1432C7 | 76F6EF2436F35A05D9 |
| 207 | 301F551AB03782BA3E | 8402B52213B5C96964 | 32427CFFF34549F579 | 7FFD7ACE194D4FE63D |
| 208 | 62CDA9CBC89BE6B800 | AF50C691DC4EAFA293 | 21273AAE545AB422DD | 745D3D25CC335AA48D |
| 209 | 1B185EA9D433AED1C3 | 9767DE26E0AA2B4B95 | 39FDC4EA276E161A9C | 7D4957301C0D4F4769 |
| 210 | 5AE5497CF4009DAEF9 | B795C72BAF05F2652D | 283350BB841B41C139 | 76A3BD8FC826BA05D3 |
| 211 | 232F461F17572A38C5 | 8FA2D8636C1E89742B | 30E9A901F75003B978 | 7FB7D06418675019C8 |
| 212 | 7A08A870442F5B7841 | A644AC85F3F0BA4177 | 23C64205AFB0B4847C | 7417BD24984C100378 |
| 213 | 03DD5F13A778ECEE7D | 9E6C4C32CF6BDEA871 | 3B0343BFDCFBE943C2 | 7D1C28CF480DFA189C |
| 214 | 422048C687343F96B8 | BE81AAC07F440786C9 | 2ACDD7EF8071416067 | 76F6C58F63A60F5DD9 |
| 215 | 3BF5B85B646388077B | 86A94D8943A09C97CF | 32172E540CC5FCA026 | 7FE2AF9AB3E7FABE3D |
| 216 | 6BC63BDFE725F35BE4 | ADB1B9C5D85B4F03CD | 216DBAAF0025E17AD7 | 7442E87167CCBAA9D8 |
| 217 | 120C34BDFB8DBB35D8 | 9586A1731B402BED34 | 39B743148CEEBCBD69 | 7D56859B480D4F4DC3 |
| 218 | 53F12497244177B2E2 | B574BF81AB6FED3B8C | 2879D0BB2FE4149ECC | 76A3972563A6BA0886 |
| 219 | 2A24D0B38E9202321 | 8D5C5F3697F489D28A | 30A32EFEA32F56A68D | 7FA805314C674EFB62 |
| 220 | 731CC59A6B915163A5 | A4BA2C2FF7E55AE7D6 | 23933A04FBCFFE2476 | 7417907033CC0FF1D2 |
| 221 | 0AD6CAF87746E6F599 | 9C8D34993481DE0ED0 | 3B563BBE88FB43E3C8 | 7D1C059A1C721A15C9 |
| 222 | 4B3422D3570A358D5C | BC7F2D9584AE18DF97 | 2A98AFEF2B8E0BC06D | 76F6EF25C859EF508C |
| 223 | 32E1D5B14BDD9DE360 | 844832DD47B57C316E | 324251AB58BAA9F82C | 7FE28531E7981AB497 |
| 224 | 60665161670EACBEAB | AF0593C423CE050833 | 2138E804FE8FFE8522 | 0D9732462E31A79FE4 |

TABLE 1-continued

| | | | | |
|---|---|---|---|---|
| 225 | 19B3A1FC8426FB2F68 | 97328B731F2A9E1935 | 39FDEE417244BCBD63 | 049CA052018FB27BFF |
| 226 | 58514E285B95C857AD | B7DF6D8050FAB8CF8D | 282C82112ECE149939 | 0F764AEDD5A458C145 |
| 227 | 2184B94A47427FC66E | 8FE875376C1E3C268B | 30F67BAAA27AB6A687 | 067DDF07FA1A4D22A1 |
| 228 | 78BCAF251445EE86EA | A611FE2E0C7010EBD7 | 23C668A F511A01DC7C | 0DDDB24685B112C011 |
| 229 | 01695FB908EDA6E8D6 | 9E39196730EB6BFAD1 | 3B036915762EBC1C3D | 04D6205355F0F8DC0A |
| 230 | 408BB06C28DE8A6813 | BECB079580BB4D2C69 | 2ACDFABB2AA4143F98 | 0F3CCAED7E5B12614F |
| 231 | 3941BF0FCBF6DDF9D0 | 86E3E0DD43DFC9C56F | 3208FCFF5990B60026 | 063758F951E5187D54 |
| 232 | 69723C8AB730A6A54F | ADFB1491D82405AE92 | 216D97FBAAF0ABDD28 | 0D88E0ED7A4E47954E |
| 233 | 10B83416AB98EECB73 | 95D3F426E4BF614794 | 39A896402644161D69 | 049C8D07558FAD8955 |
| 234 | 514523C38BABC24C49 | B521ED2A5490B86ED3 | 2879FDEF853141C133 | 0F7667B881DBB8CC10 |
| 235 | 288F2B5F977C75DD8A | 8D090D9C97F43C87D5 | 30BCFC540985FC068D | 067DF252AE65B2D00B |
| 236 | 71B73D313B84049AF1 | A4F0817BF7E5F04D76 | 238CE8AE511AB48476 | 0DDD9F13D1CEF2CD44 |
| 237 | 0862CA52D8AC4CF332 | 9CD861CCCB7E8B5B8F | 3B5616EBDDAE16BBC8 | 04C9F507FE0F18D15F |
| 238 | 49802587F8E09F8BF7 | BC2A78C184AEAD8D37 | 2A9882BB815B41606D | 0F231FB9D5A4F26BE5 |
| 239 | 3055D51A1BB737E234 | 84029876B835C96431 | 325D84FE0D901CA7D3 | 06288A5205E5078FFE |
| 240 | 6298D6349C9B53E7F5 | AF4F13C4884EAFA839 | 2138C551AA8FFE8F88 | 0D88CA47D09B0D32B1 |
| 241 | 1B52D9577FCCFB8E36 | 97780C8C4B55CB46C0 | 39E23B142644BCB7C9 | 04835FAC00DAE72955 |
| 242 | 5AB0317DA000370EF3 | B795ED80FB05ED9787 | 283357447AB1F4946C | 0F69B2EDD4F10D9410 |
| 243 | 2365C61E43579F60CF | 8FBD0D37C7E1697E81 | 30F656FFF67AB6ABD2 | 06622707FB4F07880B |
| 244 | 7A5DD070EFD011D84B | A64481D15870BA4C22 | 23D9BA045165E1D6D6 | 0DC24A4684E4479544 |
| 245 | 03882712F307A64988 | 9E6C616664EBDEA524 | 3B0343BFDDD143EE97 | 04D62052AB25AD895F |
| 246 | 426AC8C7D3348AC94D | BE81806AD4BBE78B9C | 2AD22FEF81240BCD32 | 0F3CCAED7F71B8CC1A |
| 247 | 3BA0C7A5CF9CC2A08E | 86A9672217DF636565 | 321729ABF26F49F28C | 0628A0F950B052D7FE |
| 248 | 6B8CBC20B35AB9FC11 | ADAE6C9173DB50F698 | 217245510170ABD07D | 0D971F1284E4F2C7E4 |
| 249 | 1246B343500D0E6DD2 | 959974264F402BE79E | 39B744EB723BF617C3 | 049C8D06AB5AE72400 |
| 250 | 53A45B698FBE3D1517 | B56B6AD500900D3126 | 28662F452EB141CC66 | 0F699FB97F0EED9945 |
| 251 | 2A71AC0B9316757B2B | 8D438A63C3F489DPDF | 30BCD6FEA27A03F427 | 067DF5AD50B0E782A1 |
| 252 | 7349BA64C06E1BC3AF | A4A5F97B5C655AED7C | 23933A04FA9AB48EDC | 0DDD98EDD09BB86011 |
| 253 | 0A83B507234653AD93 | 9C92E1CD9F01DE047A | 3B49C441762E094962 | 04C9F2F9FF5A4D840A |
| 254 | 4B7EA2D3FCF57F2AA9 | BC7F00C12F51E72D3D | 2A98A8112ADB5E92C7 | 0F3CE7B9D48E47394F |
| 255 | 32AB524FE022C8BC95 | 84481877EC357C3C3B | 325DA9AAA6101CAD79 | 063775AC04CFB2DAAB |

| Idx | $S_4$ | $S_5$ | $S_6$ | $S_7$ |
|---|---|---|---|---|
| 0 | 5A14D8A482010856BA | 1BA4C164A10D9D9D17 | D33CCD410969FC05F9 | D03F61BB47E7B4CC59 |

In an exemplary implementation, the number of cell IDs used may be equal to '768'. However, in case that the number of cell IDs used is less than or is greater than '768', a part or the whole of sequences of Table 1 may be used.

Figure 9:
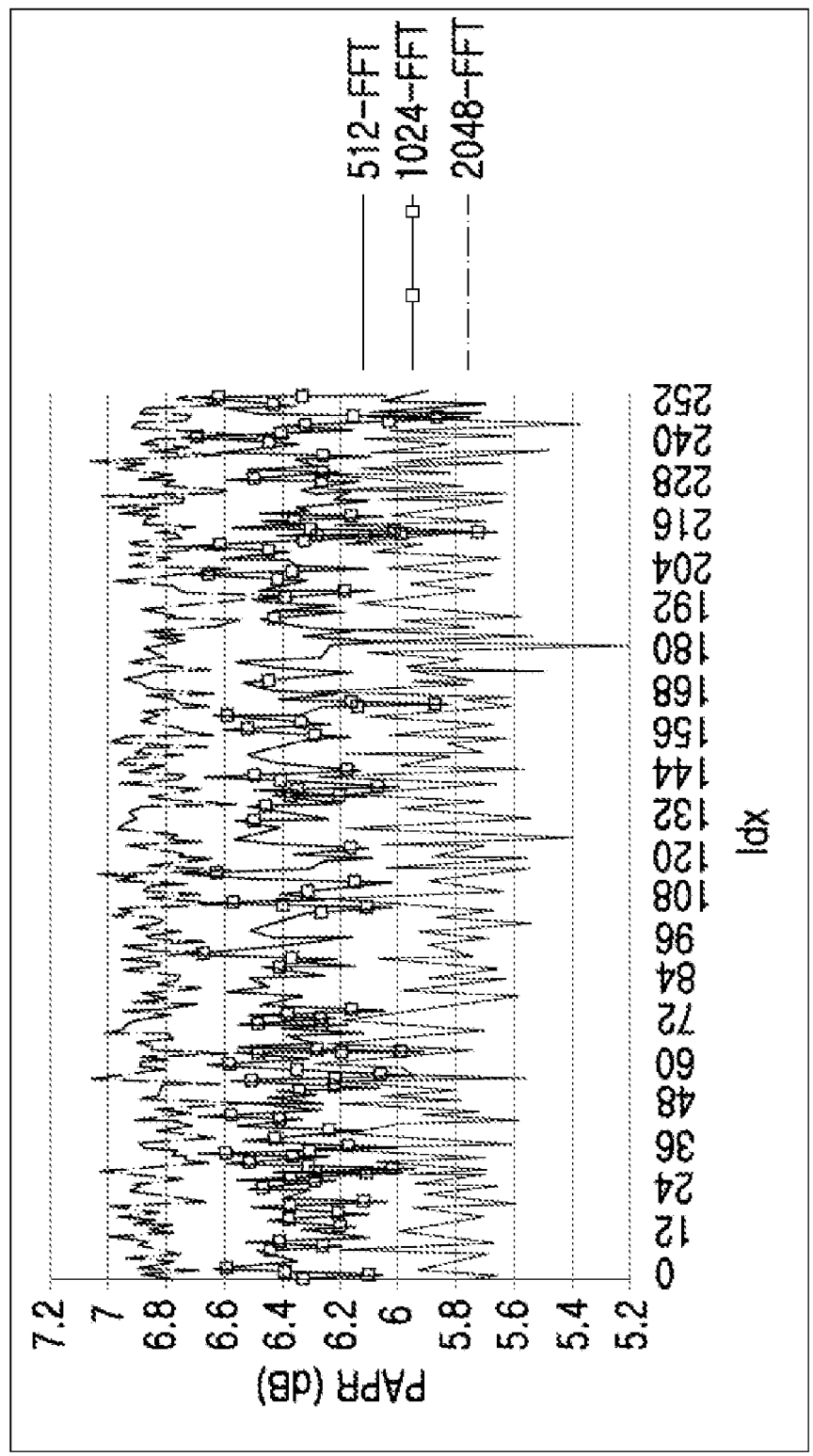
FIG. 9 is a graph illustrating a PAPR of an S-SCH signal corresponding to a cell IDentification (ID) at each FFT size according to an exemplary embodiment of the present invention.

FIG. 9 is a graph illustrating a PAPR of an S-SCH signal corresponding to a cell ID at each FFT size according to an exemplary embodiment of the present invention.

In FIG. 9, a horizontal axis denotes a running index (Idx) constituting a cell ID, and a vertical axis denotes a PAPR of an S-SCH signal corresponding to the running index (Idx). S-SCH signals corresponding to three different cell IDs having the same 'Idx' but having different segment IDs (n) have the same PAPR. In the case of a 512-FFT size, the maximum PAPR is equal to 6.27 dB. In the case of a 1024-FFT size, the maximum PAPR is equal to 6.74 dB. In the case of a 2048-FFT size, the maximum PAPR is equal to 7.06 dB. As such, an S-SCH symbol corresponding to a cell ID has a very low PAPR and thus, an exemplary embodiment of the present invention may efficiently boost a transmit power when transmitting the S-SCH symbol.

An operation of an exemplary embodiment of the present invention based on the aforementioned description is described below in detail.

Figure 10:
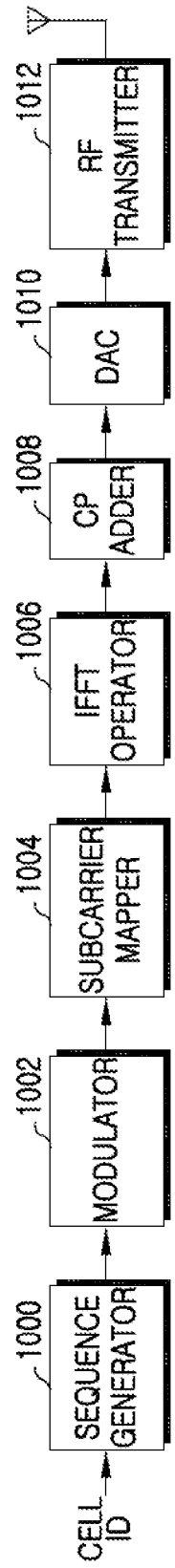
FIG. 10 is a block diagram illustrating a construction of a transmitter for transmitting an S-SCH in an IEEE 802.16m wireless communication system according to an exemplary embodiment of the present invention.

FIG. 10 is a block diagram illustrating a construction of a transmitter for transmitting an S-SCH in an IEEE 802.16m wireless communication system according to an exemplary embodiment of the present invention.

As illustrated in FIG. 10, the transmitter includes a sequence generator 1000; a modulator 1002, a subcarrier mapper 1004, an IFFT operator 1006, a Cyclic Prefix (CP) adder 1008, a Digital to Analog Converter (DAC) 1010, and a Radio Frequency (RF) transmitter 1012.

Referring to FIG. 10, the sequence generator 1000 generates a sequence dependent on a cell ID from an upper controller (not shown). For example, the sequence generator 1000 includes a memory table such as Table 1 above, and may acquire a sequence dependent on an input cell ID, from the memory table. For another example, the sequence generator 1000 stores only a sequence dependent on a cell ID corresponding to a BS, and may generate the stored sequence under control of the upper controller (not shown).

The modulator 1002 modulates the sequence from the sequence generator 1000 according to a determined modulation scheme. For example, the modulator 1002 modulates the sequence into a power-boosted BPSK signal.

The subcarrier mapper 1004 maps the modulated sequence from the modulator 1002 to subcarriers of a subcarrier set corresponding to a segment ID. For example, the subcarrier set may be configured as in FIG. 5, 6, or 7 described above depending on an FFT size and a segment ID.

The IFFT operator 1006 IFFT-operates a signal mapped to subcarriers by the subcarrier mapper 1004 and outputs time domain sample data. The CP adder 1008 adds a guard interval (e.g., a CP) to the sample data from the IFFT operator 1006 and generates an S-SCH signal (or an S-SCH symbol). Here, the IFFT operator 1006 and the CP adder 1008 may be constructed as one OFDM modulator.

The DAC 1010 converts the S-SCH symbol from the CP adder 1008 into an analog signal. The RF transmitter 1012 converts the baseband analog signal from the DAC 1010 into an RF signal and transmits the RF signal through an antenna.

On the other hand, an MS acquires a cell ID using an S-SCH signal received from a BS. At this time, the MS may acquire the segment ID by measuring a receive power on a per-segment basis, and may acquire a running index (Idx) through sequence detection in a frequency domain from a receive signal of a subcarrier set corresponding to the acquired segment ID.

Figure 11:
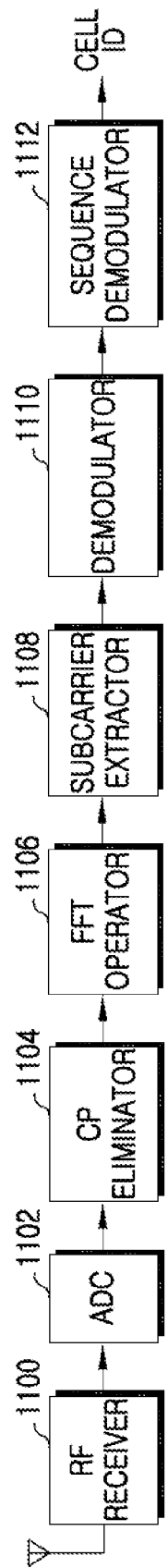
FIG. 11 is a block diagram illustrating a construction of a receiver for receiving an S-SCH in an IEEE 802.16m wireless communication system according to an exemplary embodiment of the present invention.

FIG. 11 is a block diagram illustrating a construction of a receiver for receiving an S-SCH in an IEEE 802.16 in wireless communication system according to an exemplary embodiment of the present invention.

As illustrated in FIG. 11, the receiver includes an RF receiver 1100, an Analog to Digital Converter (ADC) 1102, a CP eliminator 1104, an FFT operator 1106, a subcarrier extractor 1108, a demodulator 1110, and a sequence demodulator 1112.

Referring to FIG. 11, the RF receiver 1100 converts an RF signal received from an antenna into a baseband analog signal. The ADC 1102 samples the baseband analog signal from the RF receiver 1100 and converts the sampled analog signal into a digital signal The CP eliminator 1104 eliminates a guard interval that is inserted into the signal from the ADC 1102. The FFT operator 1106 performs an FFT operation for the signal from which the guard interval is eliminated by the CP eliminator 1104, thereby outputting a frequency domain signal from a time domain signal. Here, the CP eliminator 1104 and the FFT operator 1106 may be constructed as one OFDM demodulator.

The subcarrier extractor 1108 acquires a segment ID by measuring a receive power on a per-segment basis, and extracts only signals of a subcarrier set corresponding to the acquired segment ID, from the frequency domain signal from the FFT operator 1106.

The demodulator 1110 demodulates the signals of the subcarrier set extracted by the subcarrier extractor 1108, in a method corresponding to a modulation method used in the modulator 1002.

The sequence demodulator 1112 includes the same memory table as Table 1 above, determines a correlation value between a sequence detected by the demodulation of the demodulator 1110 and all sequences of the memory table, and determines a running index (Idx) corresponding to a sequence having the maximum correlation value. Also, the sequence demodulator 1112 outputs a cell ID that, in Equation 2, is determined from the segment ID already acquired and the running index (Idx) determined through the correlation value determination.

Figure 12:
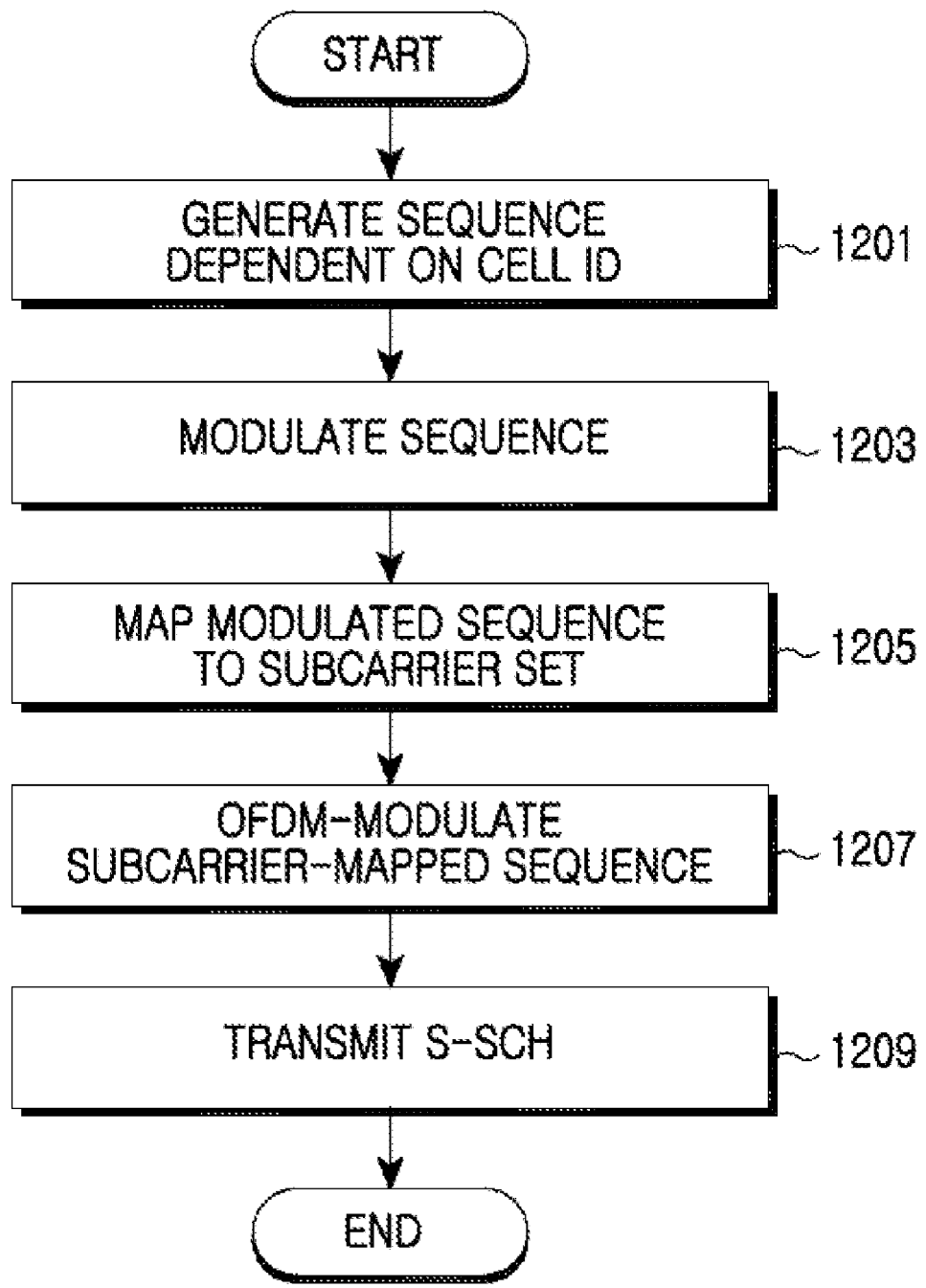
FIG. 12 is a flow diagram illustrating a procedure for transmitting an S-SCH in an IEEE 802.16m wireless communication system according to an exemplary embodiment of the present invention.

FIG. 12 is a flow diagram illustrating a procedure for transmitting an S-SCH in an IEEE 802.16m wireless communication system according to an exemplary embodiment of the present invention.

Referring to FIG. 12, a transmitter (i.e., a BS) generates a sequence dependent on its own cell ID in step 1201. At this time, the transmitter generates a sequence based on an FFT size and Table 1 above.

In step 1203, the transmitter modulates the sequence. For example, the transmitter may modulate the sequence into a power-boosted BPSK signal.

In step 1205, the transmitter maps the modulated sequence to subcarriers of a subcarrier set corresponding to a segment ID of the cell ID. At this time, the subcarrier set may be configured as shown in FIG. 5, 6, or 7 depending on an FFT size and a segment ID.

In step 1207, the transmitter OFDM-modulates the subcarrier-mapped sequence and generates an S-SCH signal (i.e., an S-SCH symbol). Here, the OFDM modulation includes an IFFT operation, a CP addition, etc.

In step 1209, the transmitter RF-processes and transmits the generated S-SCH signal to an MS. At this time, the S-SCH signal may be transmitted at the front sub-frame within a frame, and may be transmitted at determined time intervals.

Then, the transmitter terminates the procedure.

Figure 13:
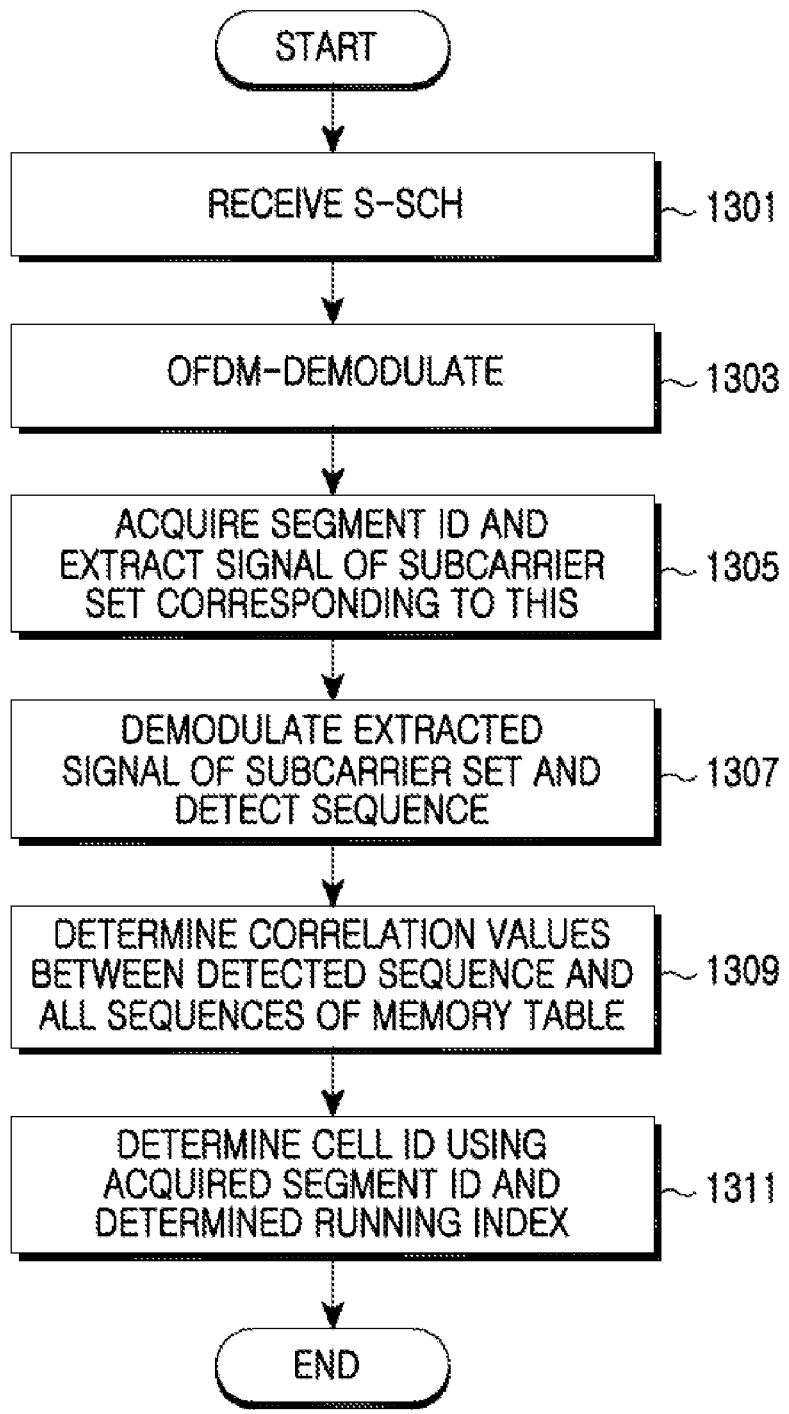
FIG. 13 is a flow diagram illustrating a procedure for receiving an S-SCH in an IEEE 802.16m wireless communication system according to an exemplary embodiment of the present invention.

FIG. 13 is a flow diagram illustrating a procedure for receiving an S-SCH in an IEEE 802.16m wireless communication system according to an exemplary embodiment of the present invention Referring to FIG. 13, a receiver (i.e., an MS) receives an S-SCH signal from a BS in step 1301. At this time, the S-SCH signal may be received at the front sub-frame within a frame, and may be received at determined time intervals.

In step 1303, the receiver OFDM-demodulates the received S-SCH signal. Here, the OFDM demodulation includes a CP elimination, an FFT operation, etc.

In step 1305, the receiver acquires a segment ID by measuring a receive power on a per-segment basis, and extracts only signals of a subcarrier set corresponding to the acquired segment ID, from the OFDM-demodulated signal.

In step 1307, the receiver demodulates the extracted signals of the subcarrier set in a method corresponding to a modulation method used in a BS, and detects a sequence.

In step 1309, the receiver determines correlation values between the sequence detected by the demodulation and all sequences of a memory table, and determines a running index (Idx) corresponding to a sequence having the maximum correlation value.

In step 1311, the receiver determines a cell ID through Equation 2 above using the segment ID already acquired and the running index (Idx) determined through the correlation value determination.

Then, the receiver terminates the procedure.

As described above, exemplary embodiments of the present invention proposes an S-SCH for making cell ID distinguishment possible in an IEEE 802.16m wireless communication system. The exemplary embodiments of the present invention may advantageously support a variety of MSs each supporting different bandwidths because the S-SCH of the exemplary embodiments of the present invention includes sequences having a feature of scalability for a variety of FFT sizes. Also, the exemplary embodiments of the present invention may advantageously support a Femto cell by supporting many cell IDs.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting, by a transmitter, a Secondary Synchronization CHannel (S-SCH) in a communication system, the method comprising: determining a subcarrier set comprising subcarriers for use in mapping of a sequence to be transmitted using the equation:

$$SSCHCarrierSet_n = n + 3 \cdot k + 40 \cdot \frac{N_{SSCH}}{144} + \left\lfloor \frac{2 \cdot k}{N_{SSCH}} \right\rfloor$$

wherein, $SSCHCarrierSet_n$ denotes an $n^{th}$ subcarrier set, n denotes an index of a subcarrier set representing a segment ID and has a value of '0', '1', or '2', k denotes a running index having a value of '0' to '$N_{SSCH}$-1' for each FFT sizes, and $N_{SSCH}$ denotes the number of subcarriers allocated for S-SCH and has a value of '144' at 512-FFT size, '288' at 1024-FFT size, and '576' at 2048-FFT size, respectively; and transmitting the sequence.

2. The method of claim 1,
further comprising:
generating the sequence depending on a cell IDentification (ID); and
mapping the generated sequence to the subcarriers of the determined subcarrier set.

3. The method of claim 2, further comprising modulating the generated sequence for mapping.

4. The method of claim 2, further comprising:
Orthogonal Frequency Division Multiplexing (OFDM)-modulating the subcarrier-mapped sequence to generate an S-SCH symbol; and
transmitting the generated S-SCH symbol to a receiver.

5. The method of claim 1, wherein, among the subcarriers included in the subcarrier set, two subcarriers interposing a Direct Current (DC) subcarrier have four index intervals, and remaining subcarriers each have three index intervals with an adjacent subcarrier.

6. A transmitter for transmitting a Secondary Synchronization CHannel (S-SCH) in a communication system, the transmitter comprising: a subcarrier mapper for determining a subcarrier set comprising subcarriers, and for mapping a sequence to the subcarriers of the determined subcarrier set using the equation:

$$SSCHCarrierSet_n = n + 3 \cdot k + 40 \cdot \frac{N_{SSCH}}{144} + \left\lfloor \frac{2 \cdot k}{N_{SSCH}} \right\rfloor$$

wherein, $SSCHCarrierSet_n$ denotes an $n^{-th}$ subcarrier set, n denotes an index of a subcarrier set representing a segment ID and has a value of '0', '1', or '2', k denotes a running index having a value of '0' to '$N_{SSCH}$-1' for each FFT sizes, and $N_{SSCH}$ denotes the number of subcarriers allocated for S-SCH and has a value of '144' at 512-FFT size, '288' at 1024-FFT size, and '576' at 2048-FFT size, respectively; and a transmitting block for transmitting the sequence.

7. The transmitter of claim 6,
further comprising a sequence generator for generating the sequence depending on a cell IDentification (ID).

8. The transmitter of claim 6, further comprising a modulator for modulating the generated sequence for mapping.

9. The transmitter of claim 6, further comprising:
an Orthogonal Frequency Division Multiplexing (OFDM) modulator for OFDM-modulating the subcarrier-mapped sequence to generate an S-SCH symbol; and
a Radio Frequency (RF) transmitter for transmitting the generated S-SCH symbol to a receiver.

10. The transmitter of claim 6, wherein, among the subcarriers included in the subcarrier set, two subcarriers interposing a Direct Current (DC) subcarrier have four index intervals, and remaining subcarriers each have three index intervals with an adjacent subcarrier.

11. A method for receiving, by a receiver, a Secondary Synchronization CHannel (S-SCH) in a communication system, the method comprising:
extracting signals of a subcarrier set corresponding to a segment IDentification (ID) from a received signal, the subcarrier set being determined using the equation:

$$SSCHCarrierSet_n = n + 3 \cdot k + 40 \cdot \frac{N_{SSCH}}{144} + \left\lfloor \frac{2 \cdot k}{N_{SSCH}} \right\rfloor$$

wherein, $SSCHCarrierSet_n$ denotes an $n^{-th}$ subcarrier set, n denotes an index of a subcarrier set representing a segment ID and has a value of '0', '1', or '2', k denotes a running index having a value of '0' to '$N_{SSCH}$-1' for each FFT sizes, and $N_{SSCH}$ denotes the number of subcarriers allocated for S-SCH and has a value of '144' at 512-FFT size, '288' at 1024-FFT size, and '576' at 2048-FFT size, respectively; and
demodulating the extracted signals of the subcarrier set and detecting a sequence dependent on a cell ID.

12. The method of claim 11, further comprising:
receiving the signal in an S-SCH domain within a frame;
Orthogonal Frequency Division Multiplexing (OFDM)-demodulating the received signal; and
measuring a receive power by segment and acquiring the segment ID.

13. The method of claim 11, wherein, among the subcarriers included in the subcarrier set, two subcarriers interposing a Direct Current (DC) subcarrier have four index intervals, and remaining subcarriers each have three index intervals with an adjacent subcarrier.

14. The method of claim 11, further comprising:
determining correlation values between the sequence detected by the demodulation and all sequences of a memory table; and
determining a running index (Idx) corresponding to a sequence having the maximum correlation value.

15. The method of claim 14, further comprising:
determining a cell ID using the segment ID acquired and the determined running index (Idx).

16. A receiver for receiving a Secondary Synchronization CHannel (S-SCH) in a communication system, the receiver comprising:
a subcarrier extractor for extracting signals of a subcarrier set corresponding to a segment IDentification (ID) from a received signal, the subcarrier set being determined using the equation:

$$SSCHCarrierSet_n = n + 3 \cdot k + 40 \cdot \frac{N_{SSCH}}{144} + \left\lfloor \frac{2 \cdot k}{N_{SSCH}} \right\rfloor$$

wherein, $SSCHCarrierSet_n$ denotes an $n^{-th}$ subcarrier set, n denotes an index of a subcarrier set representing a segment ID and has a value of '0', '1', or '2', k denotes a running index having a value of '0' to '$N_{SSCH}$-1' for each FFT sizes, and $N_{SSCH}$ denotes the number of subcarriers allocated for S-SCH and has a value of '144' at 512-FFT size, '288' at 1024-FFT size, and '576' at 2048-FFT size, respectively; and
a demodulator for demodulating the extracted signals of the subcarrier set and for detecting a sequence dependent on a cell ID.

17. The receiver of claim 16, further comprising:
a Radio Frequency (RF) receiver for receiving the signal in an S-SCH domain within a frame; and
an Orthogonal Frequency Division Multiplexing (OFDM) demodulator for OFDM-demodulating the received signal,
wherein the subcarrier extractor measures a receive power by segment and acquires the segment ID.

18. The receiver of claim 16, wherein, among the subcarriers included in the subcarrier set, two subcarriers interposing a Direct Current (DC) subcarrier have four index intervals, and remaining subcarriers each have three index intervals with an adjacent subcarrier.

19. The receiver of claim 16, further comprising:
a sequence demodulator for determining correlation values between the sequence detected by the demodulation and all sequences of a memory table, and for determining a running index (Idx) corresponding to a sequence having the maximum correlation value.

20. The receiver of claim 19, wherein the sequence demodulator determines a cell ID using the segment ID acquired and the determined running index (Idx).

* * * * *